(12) United States Patent
Seiler

(10) Patent No.: US 10,019,836 B2
(45) Date of Patent: Jul. 10, 2018

(54) PLANAR DEPTH REPRESENTATIONS FOR BLOCK COMPRESSION

(71) Applicant: Intel Corporation, Santa Clara, CA (US)

(72) Inventor: Larry Seiler, Boylston, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/167,865

(22) Filed: May 27, 2016

(65) Prior Publication Data

US 2017/0345207 A1 Nov. 30, 2017

(51) Int. Cl.
*G06T 15/40* (2011.01)
*G06T 15/00* (2011.01)
*G06T 1/20* (2006.01)

(52) U.S. Cl.
CPC ............ *G06T 15/405* (2013.01); *G06T 1/20* (2013.01); *G06T 15/005* (2013.01); *G06T 2200/04* (2013.01)

(58) Field of Classification Search
CPC .......... G06T 15/00–15/87; G06T 17/00–17/30; G06T 19/00–19/20
See application file for complete search history.

(56) References Cited

U.S. PATENT DOCUMENTS

| | | | |
|---|---|---|---|
| 6,961,057 B1 * | 11/2005 | Van Dyke | G06T 15/405 345/422 |
| 2004/0091160 A1 * | 5/2004 | Hook | G06T 9/00 382/239 |
| 2014/0267238 A1 * | 9/2014 | Lum | G06T 3/403 345/419 |

* cited by examiner

*Primary Examiner* — Daniel Hajnik
(74) *Attorney, Agent, or Firm* — Schiff Hardin LLP

(57) ABSTRACT

Described herein are technologies related to facilitate high precision and resolution of a depth (Z) buffer storage during a process of rendering 3D scenes. More particularly, during an interpolation, encoding, and/or storing processes in a graphic pipeline for rendering the 3D scenes, a particular depth (Z) plane representation is configured to support an un-normalized depth and a floating point depth formats that may be used to store Z values to the Z buffer storage.

20 Claims, 24 Drawing Sheets

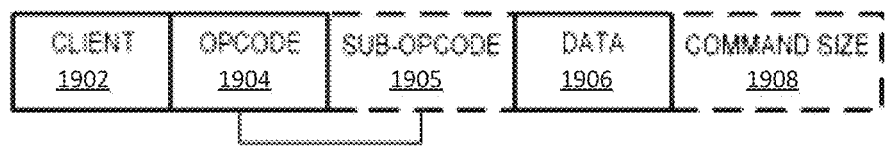
FIG 19A  GRAPHICS PROCESSOR COMMAND FORMAT
1900
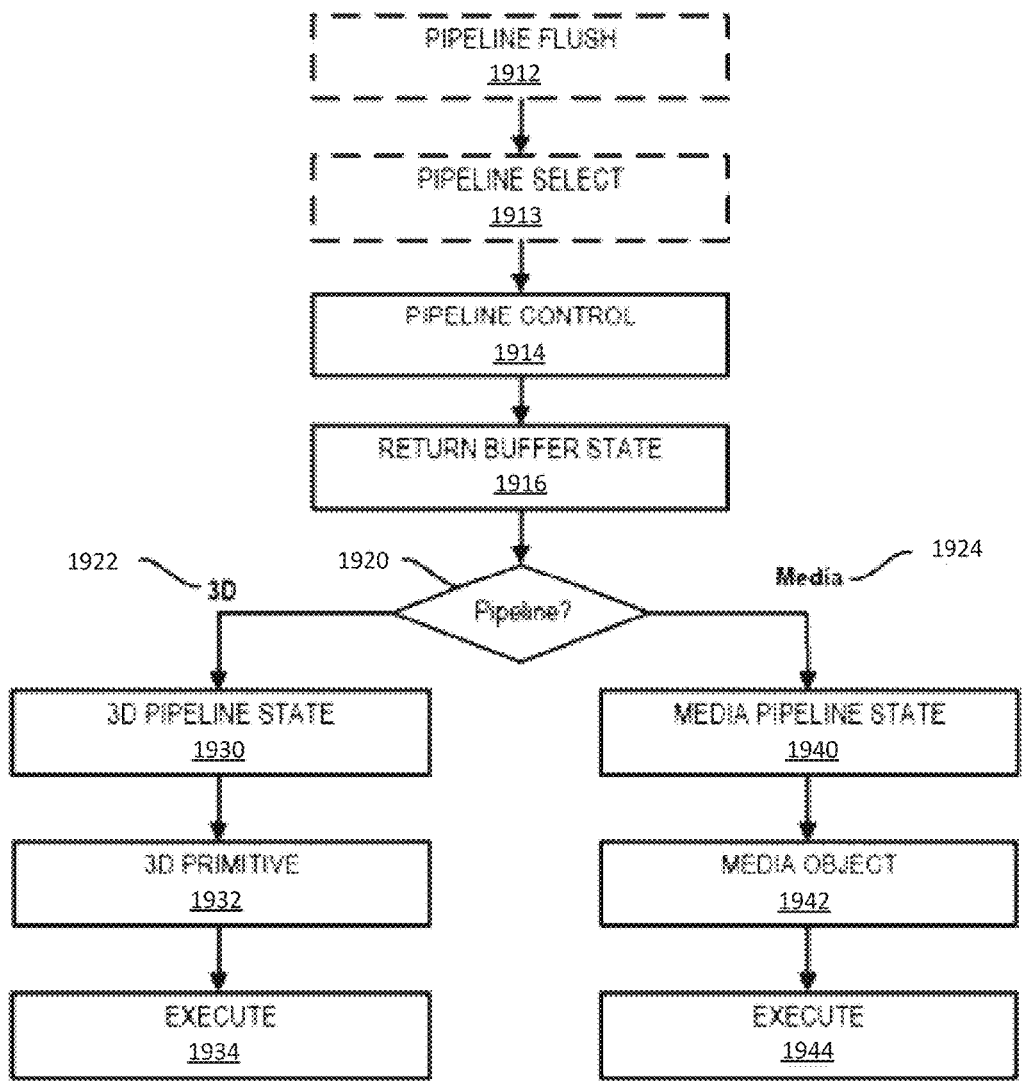
FIG 19B  GRAPHICS PROCESSOR COMMAND SEQUENCE
1910

PLANAR DEPTH REPRESENTATIONS FOR BLOCK COMPRESSION

BACKGROUND

In present computing systems, computer graphics is being utilized in a wide variety of applications such as in business, science, animation, simulation, computer-aided design, process control, electronic publication, and the like. In its most rudimentary form, a simple computer-generated object may be specified by its vertices. For example, a triangle may be represented by its three vertices. In this example, edges of the triangle may be determined by interpolating straight lines between the vertices. A viewport may be used to restrict the two dimensional region in which such a triangle is displayed.

When displayed on two dimensional screen, the preceding example of the triangle has width and height, but with no depth. While rendering the triangle, depth is used to determine whether triangles occlude each other or intersect. For 3D models, the triangle vertices are specified using (X, Y, Z) coordinates in a world coordinate space. These are processed to produce a two dimensional triangle in the coordinate space of the display screen, together with a depth value at each vertex. This processing may include specifying a view volume that clips the triangle based on depth.

Depth values (also called Z values) at individual pixels covered by the triangle are typically computed by linearly interpolating the depth values at the vertices, in the same way that colors at pixels covered by the triangle are computed by interpolating colors specified at the vertices. These depth values may be compared to determine which triangle is nearer to the viewer at each rendered pixel. Since three points determine a plane, linear interpolation between the three vertices of a triangle produces a plane in the (X, Y, Z) coordinate space. This is referred to as the Z-plane of the triangle.

BRIEF DESCRIPTION OF THE DRAWINGS

FIG. 19A is a block diagram illustrating a graphics processor command format according to an embodiment and FIG. 19B is a block diagram illustrating a graphics processor command sequence according to an embodiment.

The Detailed Description references the accompanying figures. In the figures, the left-most digit(s) of a reference number identifies the figure in which the reference number first appears. The same numbers are used throughout the drawings to references like features and components.

DETAILED DESCRIPTION

Figure 1:
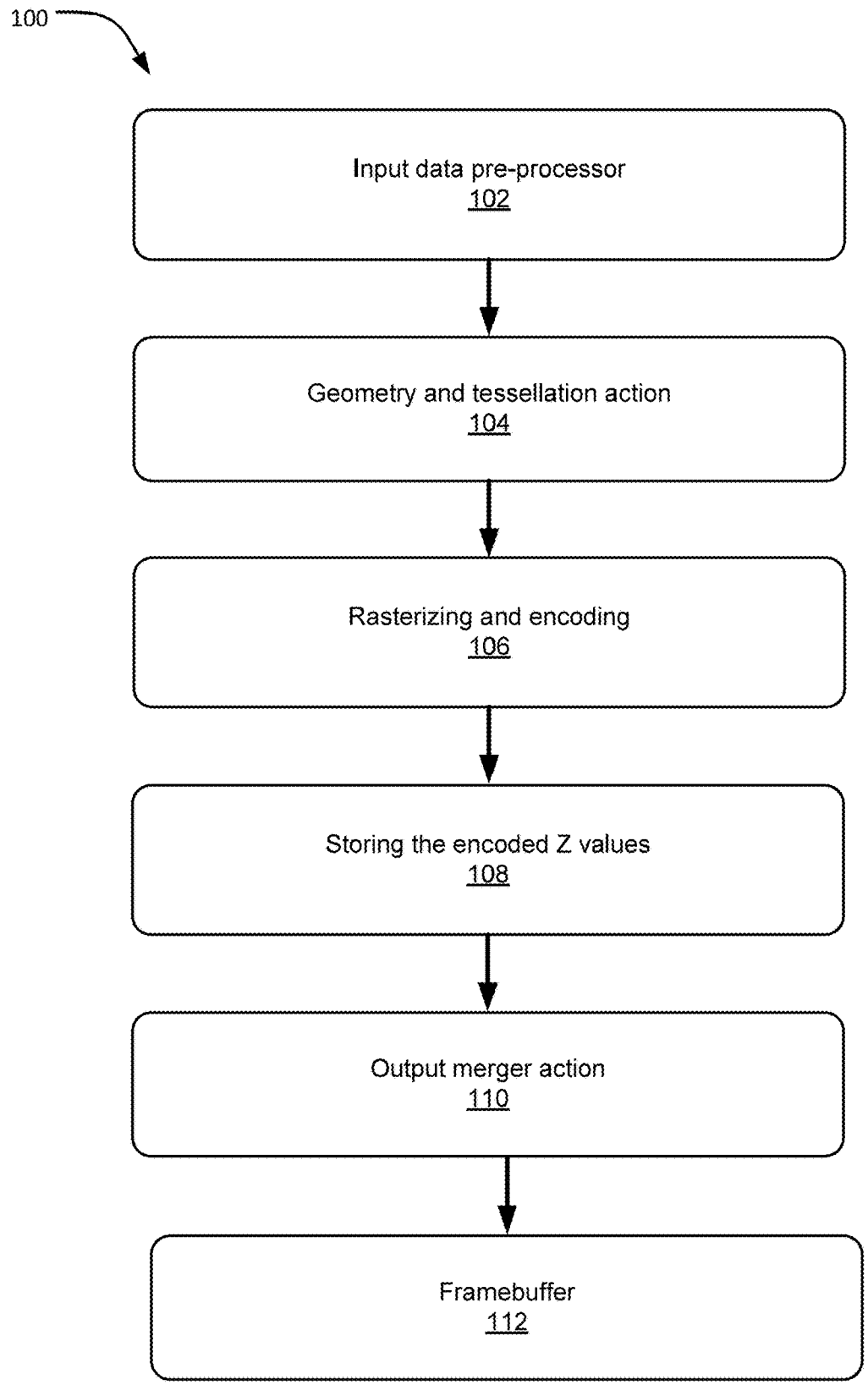
FIG. 1 illustrates a rendering process of a graphics rendering engine which may be used with implementations in accordance with the technologies described herein.

Described herein are computer graphics technologies to facilitate compact storage of the depth (Z) values at positions within a triangle. More particularly, during an interpolation, encoding, and/or storing processes in a graphic pipeline for rendering the 3D scenes, a particular depth (Z) plane representation is configured to provide a compact planar representation of the depth values over the triangle so that the depth values can be stored using this planar representation instead of storing individual depth values. This planar representation is defined to support all common depth formats, minimize interpolation error, and allow identical results to that achieved if individual depth values were stored at each rendered pixel.

A planar representation refers to defining a value in terms of a two dimensional planar equation that can be expressed as follows. Depth is the depth at a specified (X, Y) position. Zref is the depth value at a specified (Xr, Yr) reference point (e.g., reference depth value). Xslope is the amount the depth value changes for each increment in X. Yslope is the amount the depth value changes for each increment in Y. These values are computed from the triangle vertices by means known in the art.

$$Depth = Xslope*(X-Xr) + Yslope*(Y-Yr) + Zref$$

With this equation, it is only necessary to perform two multiplies and three additions in order to determine the depth at any (X, Y) position in the triangle. When this equation is used to directly compute depth values for the triangle, (Xr, Yr) is typically one of the triangle vertices, so that Zref is the depth value at that veretex. Used with block compression, (Xr, Yr) is typically a location within the block. Using Z-planes with block compression can provide significant data compression, since storing Xslope, Yslope, and Zref replaces storing a separate depth value for each pixel or sample that is covered by the triangle. However, the Z-plane precision should be defined to avoid introducing artifacts, particularly at block edges.

The Z-plane representation should be able to generate depth values in one of several common depth formats, including 32-bit floating point, referred to herein as Float32, and 16-bit and 24-bit "unnormalized" integer formats, referred to herein as Unorm16 and Unorm24. The integer values stored in the Unorm16 and Unorm24 formats are scaled by $(2^{15}-1)$ and $(2^{24}-1)$ respectively when used as depth values, which are the largest values representable in each format. The result is that the smallest and largest integer values stored as Unorm16 or Unorm24 represent depths of 0.0 and 1.0, respectively.

The technology described herein provides ways to specify Z-planes for block compression that prevent inter-block artifacts and that support the common depth formats. The technology described herein specifies the required Z plane precision based on the final depth representation and the maximum size and slopes of the triangles that are represented. Block exponents are used to minimize the number of bits required for the Z plane and to reduce the complexity of supporting computations on floating point depth values.

Graphics Rendering Pipeline

Within the context of 2D and 3D computer graphics, vector graphics is rendered. That is, a system creates an image from a 2D or 3D models (or a collection of models that might be called a scene).

A graphics rendering engine used to generate computer graphics images commonly includes a set of processing engines organized in a dataflow-style pipeline. Such images are conventionally composed of geometric primitives (e.g., triangles).

FIG. 1 is an illustration of a typical rendering process 100 of a graphics rendering engine in the realm of 2D or 3D computer graphics. The technologies described herein are implemented as a part of process 100 or a similar rendering process. This process is implemented, at least in part, by a computer graphics system (i.e., graphics rendering engine).

To render a computer-graphics image, each triangle is transformed into a screen-aligned coordinate system, which is often called a "screen space." Manipulation of the geometric primitives up to and including the transformation into screen space are typically performed in the graphics rendering engine by a geometry processing unit, which passes results to a rasterization unit. The rasterization unit decomposes each geometric primitive into fragments for further processing.

A fragment associated with each screen space pixel is either fully or partially covered by the geometric primitive. The coverage of a particular fragment (i.e., "fragment coverage") indicates the portion of the screen space pixel corresponding to the fragment that is covered by the geometric primitive. Each fragment may also have associated data (e.g., depth and color values). The depth value or Z value of a fragment is compared to a previously stored depth value to determine the visibility of that fragment. If the fragment is visible, the color value of the fragment either contributes to or uniquely determines the color of the corresponding pixel. When a fragment is found to be visible, its corresponding fragment data (e.g., depth and color values) are written to a frame buffer memory.

Depth values and color values may each undergo read, write and read-modify-write operations on the frame buffer memory. The graphics rendering engine and the frame buffer memory are commonly in different chips, requiring all frame buffer accesses to be conducted over a chip-to-chip interconnect. The data bandwidth between the graphics rendering engine and the external memory devices making up the frame buffer is called memory bandwidth and is commonly one of the most significant factors limiting system performance.

Block 102 is the input data pre-processor. Here, the computer graphics system manages, handles, and preprocesses various forms of input data related to rendering a scene. For example, it may read primitive data (e.g., points, lines and/or triangles) from user-filled buffers and assemble the data into primitives that will be used by the other pipeline stages. In some instances, the input data pre-processor may assemble vertices into several different primitive types (e.g., line lists, triangle strips, or primitives with adjacency).

Block 104 is the geometry and tessellation action. Here, the computer graphics system performs shading based on various forms of geometry (e.g., vertices, hulls, domain, and geometry). Also, the system defines tessellation.

Block 106 is the rasterizer. Here, the computer graphics system converts and transforms the vector information (e.g., composed of shapes or primitives) into a raster image (e.g., composed of pixels) for the ultimate purpose of displaying on a screen. During rasterization, the primitives are converted into pixels. Furthermore, interpolations, Z-buffering, blending, texturing, and anti-aliasing may be performed at the rasterizer.

For example, the primitives (e.g., triangle) are interpolated to generate a pixel data. The generated pixel data are then encoded into a lesser number of bits, which are stored in the Z buffer storage. In this example, the interpolation, encoding and subsequent storage of encoded Z values may utilize the block compression of the Z values using a particular Z format (e.g., Z-plane representation) as described herein.

Block 108 is storing the encoded Z values. Here, the Z buffer storage stores a minimal number of encoded bits. The minimal number of encoded bits has high precision and resolution due to the use of the configured Z-plane representation as described herein.

Block 110 is the output-merger action. Here, the computer graphics system combines various types of output data (e.g., color values, depth values, etc.) with the other relevant data to produce a final version of the output. That final version includes, for example, color and depth values for each pixel.

Block 112 is the framebuffer action. Here, the computer graphics system populates the framebuffer. A framebuffer (frame buffer, or sometimes framestore) is a portion of memory containing a bitmap that is driven to a video display from a memory buffer containing a complete frame of data.

Example Computer System for 3D

Figure 2:
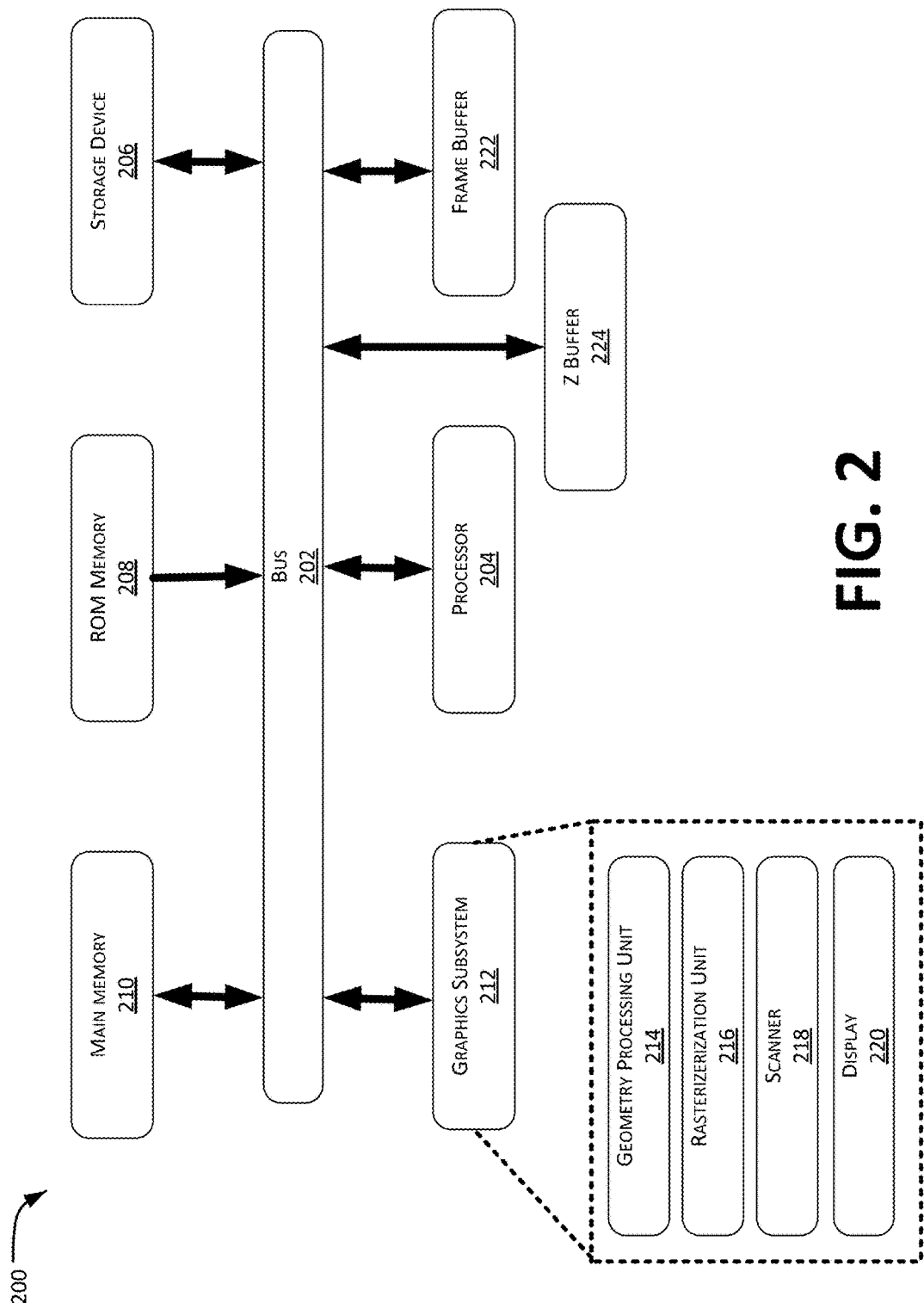
FIG. 2 illustrates an example computer system that utilizes a Z-plane representation for block compression as described herein.

FIG. 2 illustrates an example computer system 200 that implements block compression using the Z-plane representation or format as described herein. The computer system 200, for example, includes any computer controlled graphics systems for generating 3D images.

As shown, the computer system 200 includes a bus 202 for transmitting digital information between various parts of the computer system. One or more processors 204 are coupled to the bus 202 for processing the digital information, which may be stored in a hierarchical memory system such as a storage device 206, a read only memory (ROM) 208, and a main memory 210.

The storage device 206 may be used to store vast amounts of digital data while the ROM memory 208 may be used to store digital data on a permanent basis such as instructions for the microprocessors. On the other hand, the main memory 210 may be used for storing digital data on an intermediate basis.

The computer system 200 further shows a graphics subsystem 212 that may receive graphics data from the processor 204. The graphics data may include coordinates of vertices, an object's geometric position, color, texture, shading, and other object data. The object data is processed by the graphics subsystem 212 using the following graphic pipeline components: geometry processing unit 214, a rasterization unit 216, a scanner subsystem 218, and a display subsystem 232.

For example, the geometry processing unit 214 may convert the graphical data (received from the processor 204) into a screen coordinate system or resulting primitives (e.g., triangle or another polygon). It is the function of the geometry processing unit 214 to perform projection and transformation process to give a perception of depth to a displayed object. In this example, the resulting primitives (e.g., triangles, polygons) are then supplied to the geometry processing unit 214 to the scanner subsystem 218 that is configured to generate pixel data based on the resulting primitives.

The scanner subsystem 218 may be configured to perform interpolation functions on the generated pixel data, and the interpolated pixel data are then forwarded to the rasterization unit 216 where Z-buffering, blending, texturing, anti-aliasing functions, and encoding are performed. In other embodiment, the rasterization unit 216 may be configured to perform the interpolation functions as well.

The resulting pixel values are subsequently stored in a frame buffer 222, while the encoded depth (Z) values are stored in a Z-buffer 224. As described herein, the Z-plane representations as further discussed below are utilized for high resolution and precision storage of the encoded Z values to the Z-buffer 224. For example, storing the encoded Z values utilizes the Z-plane representation that is configured to facilitate a lesser number of bits. In this example, the Z-plane representation or format is further configured to avoid artifacts.

The display subsystem 220 as shown reads the frame buffer 222 and displays the image on a screen display (not shown).

Requirements for Block Compression with Planar Depth

A number of problems should be solved to achieve a suitable Z-plane representation. First, the representation should provide sufficient precision to avoid introducing new types of depth error artifacts, that is, places where the Z-plane representation causes parts of the wrong triangle to be visible when one triangle occludes another. Note that ordinary depth processing can produce such artifacts, so the goal is to not introduce new artifacts due to the planar representation, rather than to avoid all artifacts.

This problem is particularly apparent when the Z-plane representation is used with block compression. Block compression refers to any of a number of techniques that compress data within a given screen footprint, or block, so that each compressed block is independent of all other blocks. Addition bits of meta-data are associated with each block to specify the compression used in the block. When a planar depth representation is used with block compression, each block stores a Z-plane for each triangle that is visible within the block.

Figure 3:
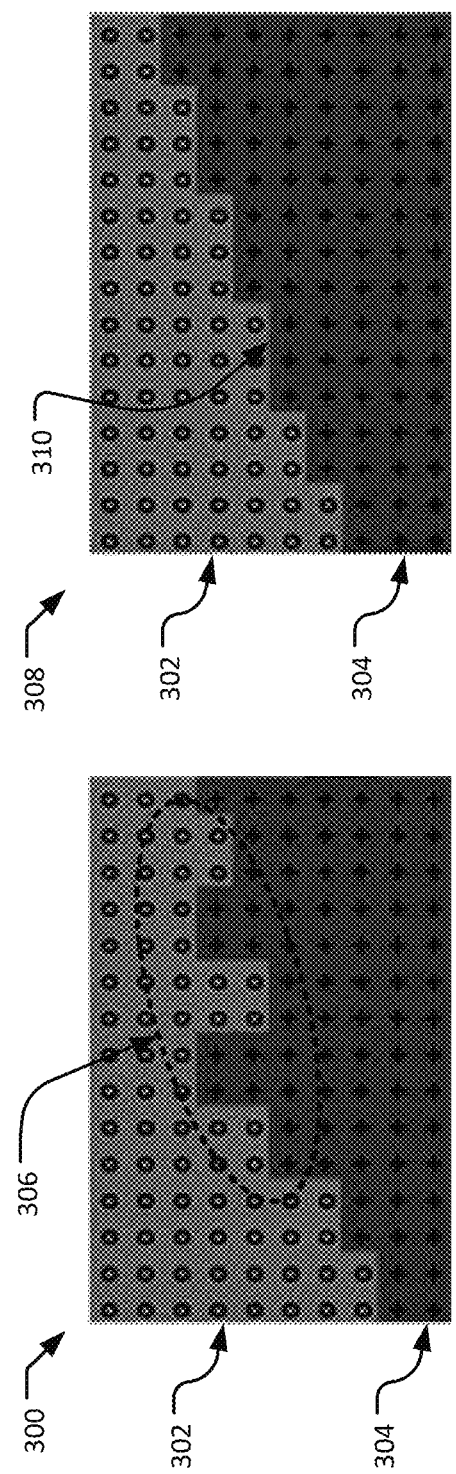
FIG. 3 illustrates an example application of block compression that uses the Z-plane representation or format as described herein.

Block compression using Z-planes can result in artifacts at the block edges, due to accuracy errors for depth values computed in two different blocks near the edge where they meet. FIG. 3 illustrates an example of the kinds of block edge artifacts that can occur during interpolation, encoding and subsequent storage of encoded Z values.

As shown, diagram 308 includes a first triangle 302 that intersects with a second triangle 304 without using a block compression planar depth representation. Depth values are computed for both triangles at individual pixels and the depth value nearest to the eye position (typically the smallest depth value) is displayed. Since the intersection of two planes is a line, the intersection shows as a line, aliased to the pixel boundaries.

Diagram 300 shows an example of what can happen when using block compression with Z-planes that have insufficient precision. Pixel values in some compression blocks of triangle 304 are computed with values that are nearer to the eye than occurs without block compression due the precision error, with the result that parts of some blocks of triangle 304 are visible in front of triangle 302. The sawtooth effect is due to the precision changing across rectangular block boundaries. The effect is exaggerated in this case by deliberately using a Z-plane representation with low precision for the Xslope, Yslope and Zref constants, but even one such sawtooth artifact is extremely noticeable, and is a type of artifact that does not occur when individual depth values are computed.

Z-planes have potential advantages over other methods of depth compression. One conventional method for block compression of Z values utilizes difference algorithms that are similar to algorithms used for (lossless) compression of color data. For example, minimum and maximum depth values for a particular block may be encoded so that only difference values from the minimum needs to be stored, using only enough bits to express the difference between minimum and maximum. This method works best for encoding 8-bit or smaller values, as is typical for color, since the differences are therefore smaller. It is less efficient for large values, such as the 16-bit, 24-bit and 32-bit depth representations, since the difference values between adjacent depth values tend to be larger.

Another feature of using Z-planes in block compression occurs if more than one triangle covers the block. In this case it is not only necessary to store a Z-plane for each triangle, but also to store a mask that selects which Z-plane to use at each sample position. This adds to the data required for block compression using Z-planes. Therefore, it increases the need for a way to store Z-planes with a minimum number of bits so that there is more room for the mask bits.

Basic Z-Plane Representation

To be suitable to use with block compression, a Z-plane representation should have a number of properties. Previously mentioned is helpful to support generating final depth values in all of the common depth representations: Float32, Unorm16, and Unorm24. It is able to be used to compute these values in a way that allows a stored the Z-plane to be used to generate the same per-sample depth values that would be produced by interpolating depth values directly from the triangle Z-plane, without first storing Z-planes in compression blocks. Additionally, it should allow depth values to be computed with sufficient precision to avoid introducing new kinds of artifacts. And finally, the Z-plane representation should be small enough to be stored efficiently in depth compression blocks.

Avoiding block edge artifacts places two constraints on the Z-plane representation. First, the Xslope and Yslope terms should be identical in every block. Typically the rasterization logic that produces the triangle Z-plane computes the slopes as Float32 values. Second, the Zref value should be specified in a way that allows two different blocks to compute the exact same depth value for points along their shared edge.

A simple way to achieve this is to compute the Zref value at some globally defined position, e.g. (0,0), so that the same Zref value may be used in all blocks. However, computing the Zref value outside the triangle can result in a Zref depth that is outside the allowed number range. Therefore, the Zref value needs to be computed at a point that is within the triangle or at least no more than a defined distance away from the triangle, so that the Zref representation can have enough range to represent all potential depth values at Zref.

A common solution is to compute the Zref value relative to a corner or the center of each compression block. If Zref is stored as an ordinary floating point number, e.g. a Float32, this can cause block edge artifacts because Zref in different blocks may have different exponents and therefore different absolute precisions. This occurs because Float32 uses an exponent to represent numbers as $2^{Exponent}$ times a fixed point mantissa. Therefore, the absolute precision for Float32 values depends on both the mantissa precision and the exponent. For all but a special case near zero, Float32 shifts the mantissa to have a one in the high order bit. This is called the "hidden bit" since it is not stored in the Float32 format.

To avoid block edge artifacts, it is necessary for the absolute precision of Zref to be identical in each compression block. That way, values near the boundary between two blocks can compute the exact same value starting from either block's Zref. This can be done by storing only a fixed point value for Zref. If an exponent is needed, e.g. to represent Float32 depth values, the exponent should be identical in each compression block's Z-plane, so that each Zref value has the same absolute precision.

Z-Plane Representation for Unorm24 and Unorm16 Z Values

Artifacts can also occur if Zref has insufficient precision, even if Zref has the same absolute precision in each block. For Unorm24, precision is sufficient if interpolating from one vertex can generate the specified value at another vertex. As a result, the required Zref precision depends on the size of the triangle and the allow range of depth values at the vertices. Unorm24 and Unorm16 depth formats can only represent depth values in the range [0.0 . . . 1.0], so when using these formats, the vertex depth values are typically clamped to that range. As a result, the minimum difference between vertex values is $2^{-24}$ for Unorm24 and $2^{-16}$ for Unorm16. The precision sufficient for Unorm24 is also sufficient for Unorm16, so precision calculations will assume use of the Unorm24 format.

Let Bt be the number of bits needed to specify the size in X or Y of the bounding box of a triangle, that is, of the minimum size rectangle that encloses the triangle. Then the total number of interpolation adds that can occur from one vertex to another is $2^{Bt}$ in X and $2^{Bt}$ in Y. Each interpolation step in X or Y increase the error by half of the lowest bit of precision, due to rounding the slope values. Accurately interpolating from one vertex to another therefore requires no more than Bt+1 additional bits beyond the 24-bits required for the resulting Unorm24 value.

Modern APIs such as DirectX allow rendering triangles into an array of up to $2^{16} \times 2^{16}$ pixels. Rasterization typically occurs into a region four times that width and height, to allow for a guard band. Vertex positions are typically specified with 8-bits of fractional precision. As a result, Bt requires 16+8 bits for DirectX and other modern APIs, so that Bt+1 equals 25. Adding the Unorm24 requirement for 24 bits of result precision brings the number of bits required for Zref up to 49.

This result must be modified in two ways. First, it is necessary to allow for overflow and underflow, due to interpolation error. As a result, the Zref value needs two more bits for sign and overflow. In terms of resulting Unorm24 values, this allows Zref to store values in the range [−2.0 . . . 2.0). This brings the required number of bits up to 51.

Second, although vertices are typically specified with 8-bits of sub-pixel precision, sample positions are typically specified with only 4-bits of sub-pixel precision. Selecting Zref at position on the sample grid means that each interpolation step adds 16× the slope, since steps on the sample grid are 16× as large as steps on the vertex grid. As a result, 4 bits may be removed from Zref. This brings the number of bits required for Zref to 47.

Figure 4:
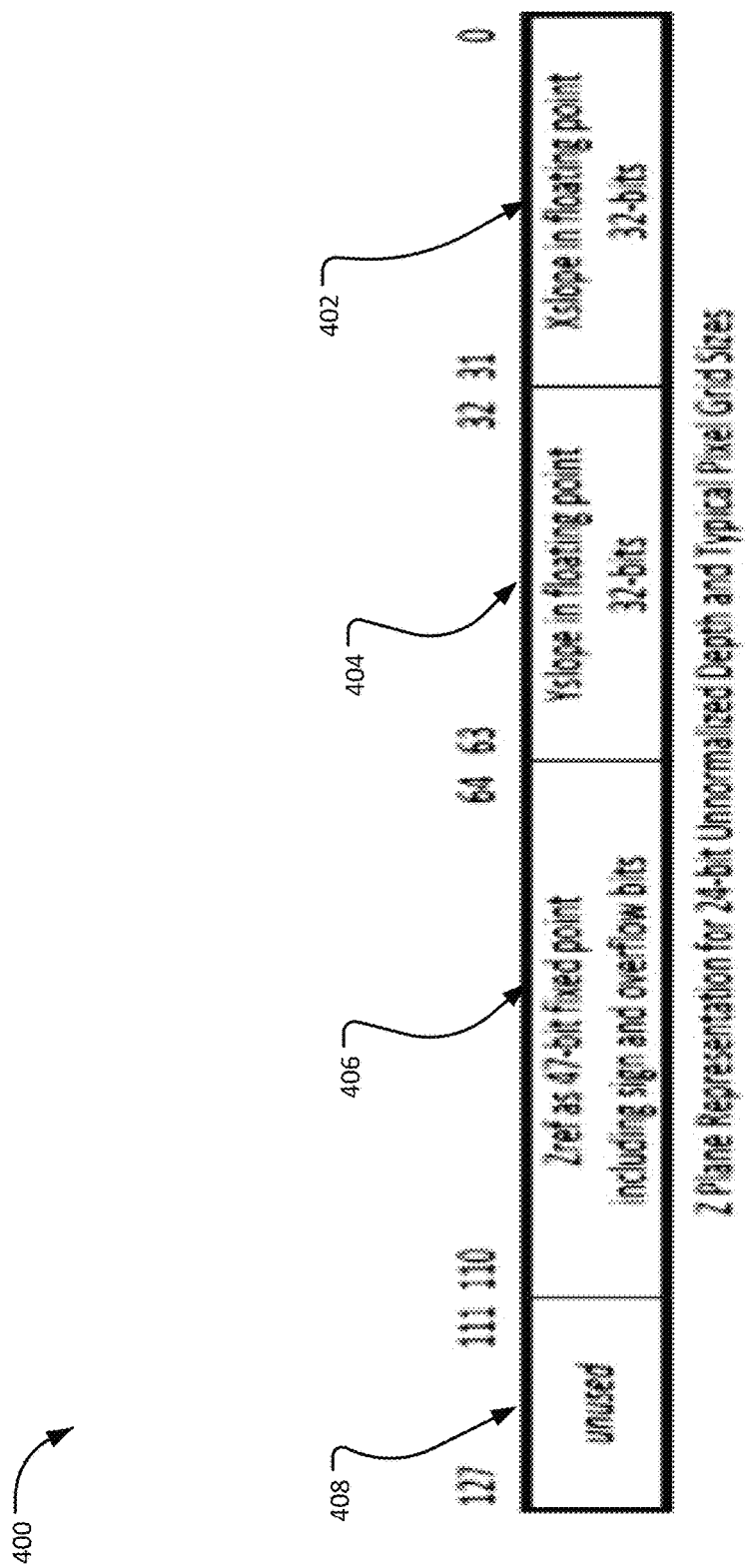
FIG. 4 illustrates an example Z-plane representation for 24-bit un-normalized depth as described herein.

FIG. 4 illustrates an example Z-plane representation 400 as described herein. Particularly, the Z-plane representation 400 shows a Z-plane representation for 24-bit un-normalized depth and typical pixel grid sizes such as those required for DirectX. Xslope 402 and Yslope 404 are both stored as Float32 values. Zref 406 is stored as a 47-bit value. When these three values are stored in a 128-bit word, This leaves 17 unused bits 408. This is an illustrative example for the specific depth precision, triangle sizes and fractional precisions used in DirectX and many other modern graphics APIs. The process described above may be used to produce other Zref sizes to suit other values for those parameters. For example, Zref for Unorm16 requires eight fewer bits than Zref for Unorm24, though typically the same Zref format would be used for both to simplify the design.

When using format 400 for block compression, Zref is computed at a defined location within each block, e.g. the center. Zref is computed from the triangle Z-plane at location (Xr, Yr) in each block and the result is rounded to the Zref precision. To ensure that all blocks generate the exact same depth values despite this rounding, Xslope 402 and and Yslope 404 need to be rounded to have no more fractional precision than the Zref. This ensures that all three terms summed in the Z-plane equation have the same precision.

Since Zref is at a fixed position in each compression block, e.g. the center, it may not be inside the triangle. This can result in overflow significantly larger than the [−2.0 . . . 2.0) range supported by the Zref sign and overflow bits. In particular, Zref can be out of range by as much as the block size times the worst cast slope. However, additional overflow bits are not required unless depth values should be computed at positions outside the triangle, which is not normally done. Zref can be computed as if it had additional high order bits that are then ignored when Zref is saved. This is referred to as modulus arithmetic. For example, consider summing 8-bit unsigned integers A, B and C. The actual sum of the three requires an extra two bits, but instead the modulus sum can be stored in 8-bits by computing (A+B+C) mod 256. Using modulus arithmetic may produce incorrect depth values outside the triangle, but inside the triangle, all computed depth values are guaranteed to be in the range [−2.0 . . . 2.0), and so depth calculated from Zref 406 and the slopes 402 and 404 will be correct for sample positions within the triangle.

In an embodiment, the wrap around is implemented by simply ignoring any carry or borrow out of high order bit(s) and this is applied for both unsigned, and two's complement signed integers.

Z-Plane Representation Float32 Depth Values

When the depth format is Float32, depth values in some APIs are still limited to the range [0.0 . . . 1.0], but in other APIs the full Float32 range is allowed for vertex depth values and depth values computed at sample positions. Therefore, Zref needs to be able to store values that cover the full Float32 range, while still meeting precision requirements. This requires storing an 8-bit exponent for Zref, to match the 8-bit exponent in Float32. To avoid block edge artifacts, the exponent should be the same in the Z-plane in each compression block, so that each Zref has the same absolute precision.

Interpolating a triangle Z-plane with floating point operations can cause significant variance in the floating point values generated, depending which vertex is used for Zref. If Zref is the vertex with the largest exponent, then the absolute precision at interpolated values is limited by the absolute precision at that vertex since Zref is added at each step. But if Zref is the vertex with the smallest exponent, initial interpolated values will have the higher absolute precision of that, until the sum results in a higher exponent.

The goal for using Z-planes with block compression is to not produce artifacts that do not already occur without block compression. Since Zref for non-block compression can have the highest vertex exponent, it is acceptable to use the highest vertex depth exponent as the Zref exponent for block compression Z-planes. This requires adding an 8-bit exponent field to the Z-plane format. Since Float32 has 24 bits of fractional precision, the Zref size for Float32 is the same as for Unorm24.

An important observation is the modulus arithmetic used to compute Zref means that Xslope and Yslope can be stored modulus the Zref range. This allows storing Xslope and Yslope with maximum exponent size that is the same as the Zref exponent. As already observed above, Xslope and Yslope need to be rounded so that their precision is no greater than the Zref precision. This permits storing Xslope and Yslope with exponent fields that are an offset from the Zref exponent. The Float32 Xslope and Yslope values have a precision of 24-bits. A 5-bit SlopeShift value is sufficient to align each 24-bit slope mantissa to any position within the 47-bit Zref, although the "hidden bit" should be explicitly stored since it could be zero. As a result, the slopes may each be represented with a 5-bit SlopeShift, a sign bit, and a 24-bit mantissa.

Finally, Xslope and Yslope can use a shared exponent, or in this case a shared SlopeShift value. This increases the rounding error of the slope term with the smaller magnitude by rounding it to fewer bits of precision than it would have with a separate SlopeShift value. However, the worst case introduced error is less than the error of the larger of the two slopes. The result is that the computed depth value at a sample can be off by no more than the difference between its depth value and a correct depth value for a position within plus or minus one grid unit. Increasing the precision of Xslope and Yslope by one bit means that the computed depth will be correct for a position within ½ a grid unit of the actual sample position. Since the vertices of the triangle are snapped to a grid position before rasterizing the triangle, this is equivalent to a source of error that already exists, and so does not count as introducing a new kind of error into the depth calculation.

Figure 5:
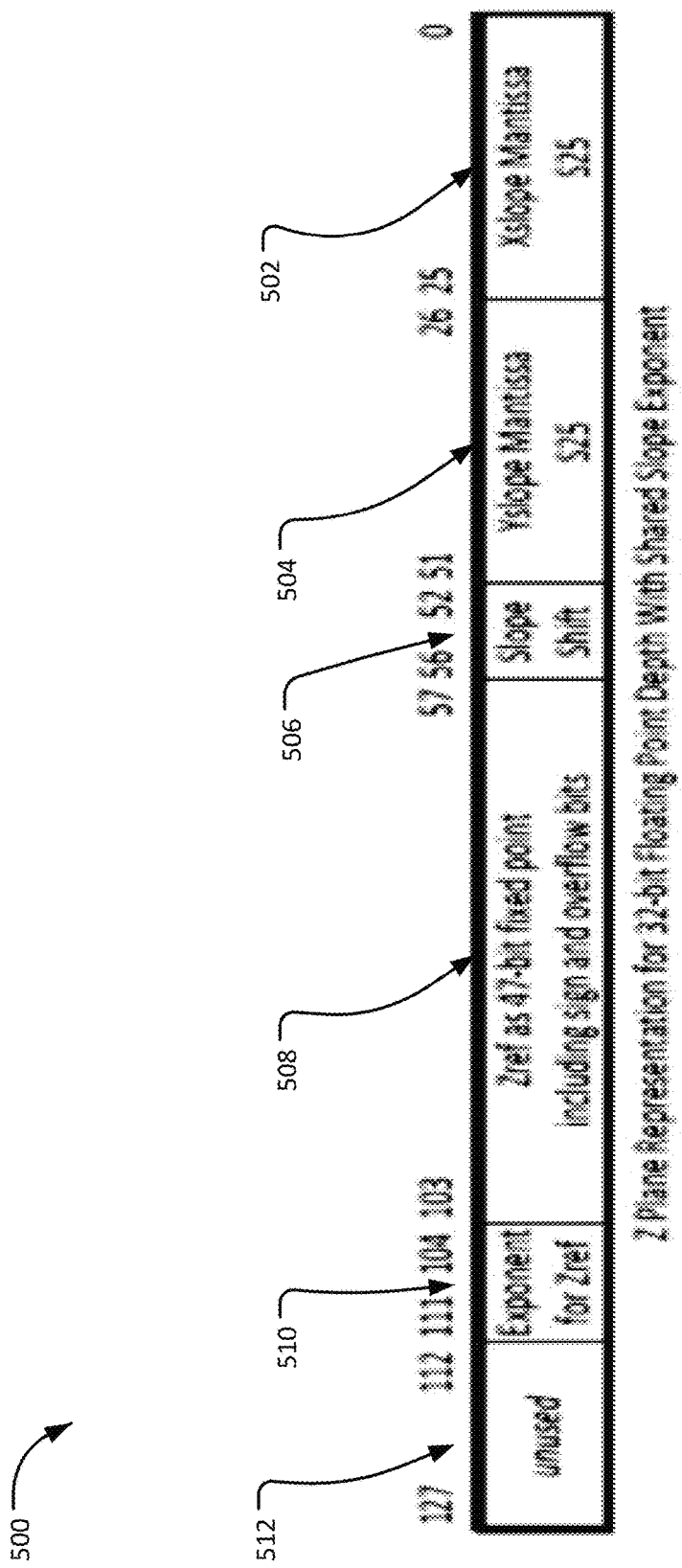
FIG. 5 illustrates an example Z-plane representation for 32-bit floating point depth with shared slope exponent as described herein.

FIG. 5 illustrates an example Z-plane representation 500 according to the methodoly described herein. Particularly, the Z-plane representation 500 shows a Z-plane representation designed to produce a Float32 depth value at each sample in the triangle for the triangle size and grid resolutions defined for DirectX and other major APIs. This format is also usable for Unorm24 and Unorm16 depth results by setting the Zref exponent to cause Zref to indicate values in the range [−2.0 . . . 2.0).

As shown, the 128-bit Z-plane representation 500 is divided into groups 502-512. That is, the group 502 includes a 25-bit "X" slope mantissa (i.e., represented by bits 0-25); the group 504 includes a 25-bit "Y" mantissa (i.e., represented by bits 26-51); the group 506 includes a 5-bit slope shift (i.e., represented by bits 52-56); the group 508 includes the Z ref as 47-bit fixed point including sign and overflow bits (i.e., represented by bits 57-103); the group 510 includes an 8-bit exponent for the Zref (i.e., represented by bits 104-111); and the group 512 includes 16 unused bits (i.e., represented by bits 112-12). The Z-plane representation 500 defines a total of 112 bits out of a 128 bit memory access unit that are configured to allow computing depth values for a triangle at sufficient precision to avoid introducing new sources of artifacts relative to existing methods of computing depth values. The group 512 (i.e., 16 unused bits) may be used to increase the other purposes such as representing or storing additional information. In another example, the unused bits may be used to increase the size of groups 502, 504, and 508 (i.e., the Zref and Xslope and Yslope mantissas) so that they provide a higher precision depth calculation, e.g. to support larger triangle sizes or a finer grid resolution.

Reduced Size Z-Plane Representation

The Z-plane representation illustrated in FIG. 5 is designed to support the worst-case triangle sizes and slopes that can be generated using the grid size and precision defined for DirectX and other modern APIs. The great majority of triangles are much smaller than the maximum size and use much shallower Xslope and Yslope values than the worst case. Accordingly, a Z-plane format that uses fewer bits may be used for many triangles, with a full size Z-plane format used for the remaining triangles.

For example, the size of Zref in the technology described herein depends on the maximum allowed triangle size. If a triangle fits without a 16×16 pixel bounding box instead of within a [−32K . . . 32K] pixel region, then Zref can be smaller by 12 bits. This also allows the shared slope shift value to be reduced from 5-bits to 4-bits, since the maximum required shift amount is reduced by 12.

Another possibility is reducing the slope precisions, e.g. from signed 24-bit to signed 18-bit. For small triangles, less slope precision is required since the reduced number of interpolations steps results in a smaller worst case accumulated error.

Figure 6:
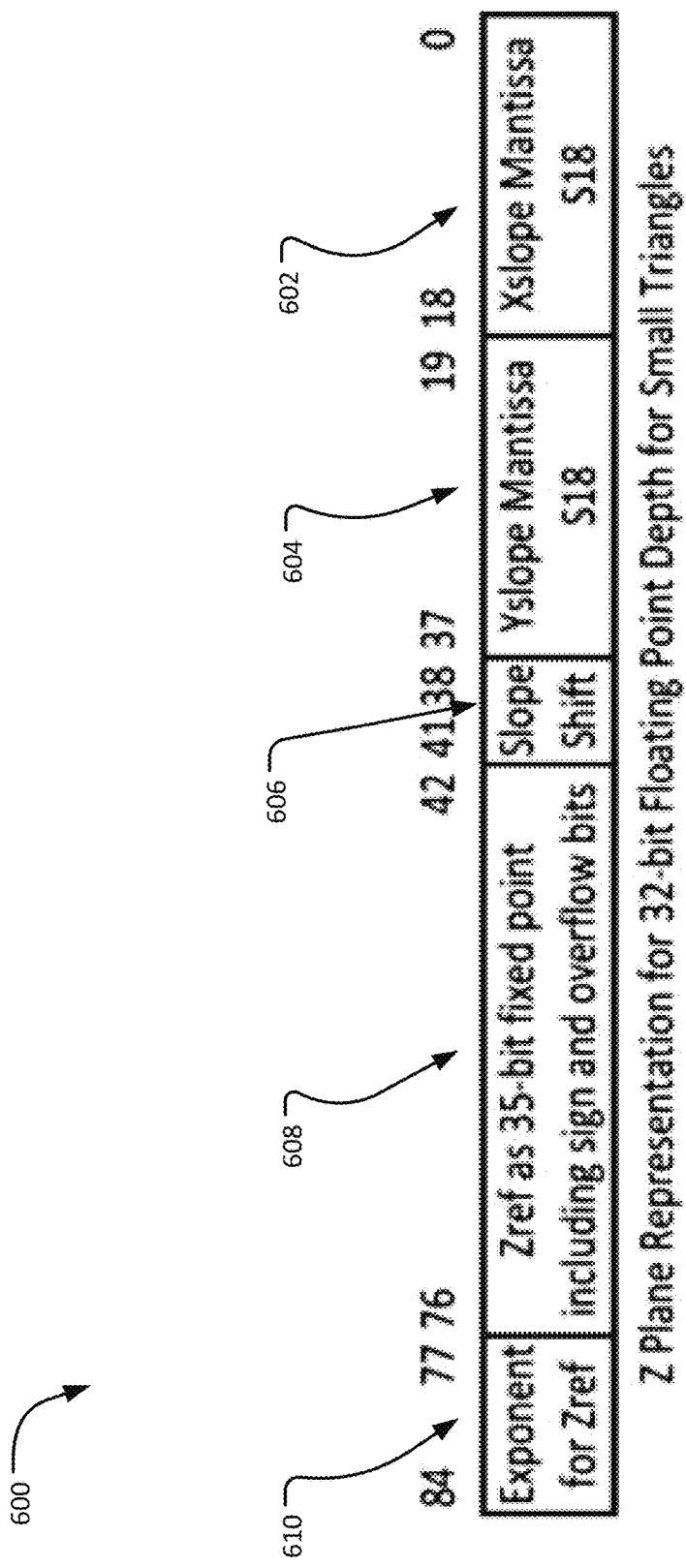
FIG. 6 illustrates an example Z-plane representation for 32-bit floating point depth for small triangles as described herein.

FIG. 6 illustrates an example Z-plane representation 600 as described herein. As shown, the Z-plane representation 600 is divided into groups 602-610. That is, the group 602 includes a 19-bit Xslope mantissa (i.e., represented by bits 0-18); the group 604 includes a 19-bit Yslope mantissa (i.e., represented by bits 19-37); the group 606 includes a 4-bit slope shift (i.e., represented by bits 38-41); the group 608 includes the Z ref as 35-bit fixed point including sign and overflow bits (i.e., represented by bits 42-76); and the group 610 includes an 8-bit exponent for the Zref (i.e., represented by bits 77-84). The Z-plane representation 600 includes a total of 85 bits configured to support generating a depth value per sample using the Float32, Unorm24 or Unorm16 formats for triangles that fit within a 16×16 pixel bounding box, assuming the sub-pixel grid precisions required by DirectX and other modern APIs.

Example Flow Chart for Rendering 3D Object

Figure 7:
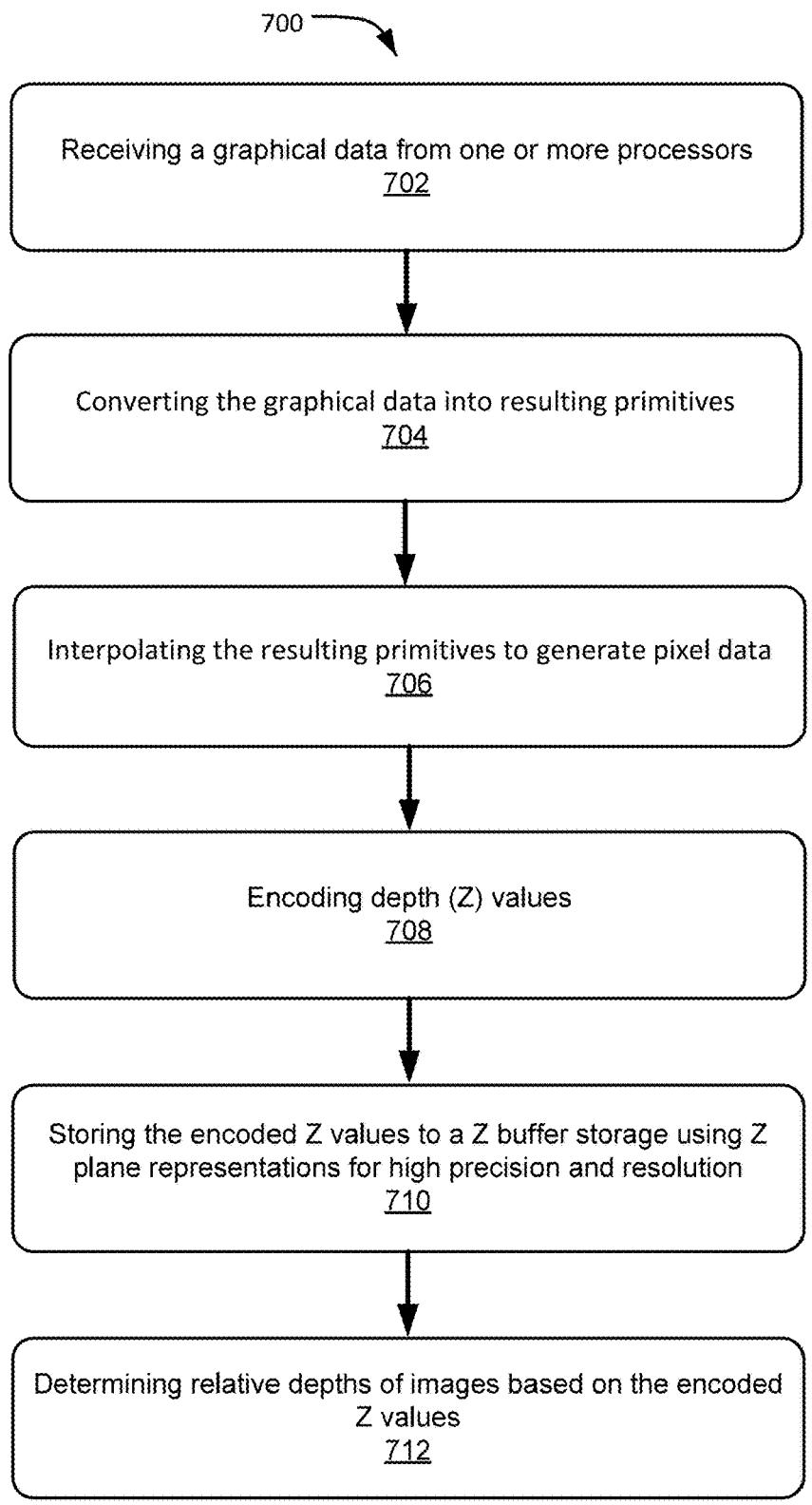
FIG. 7 illustrates an example process for rendering three-dimensional (3D) object in accordance with implementations as described herein.

FIG. 7 shows an example process 700 for illustrating the rendering of the 3D object as described herein.

At block 702, receiving a graphical data from one or more processors. For example, the graphics subsystem 212 is configured to receive graphical data from the processor 204.

At block 704, converting the graphical data into resulting primitives. Here, the geometry processing unit 214 of the graphics subsystem 212 may transform the graphical data into resulting primitives (e.g., triangle).

At block 706, interpolating the resulting primitives to generate a pixel data. For example, the scanner 218 may be configured to scan the resulting primitives to generate the pixel data.

At block 708, encoding depth (Z) values of the pixel data. For example, the rasterization unit 216 may be configured to encode Z values by block compression. In this example, the rasterization unit 216 may be further configured to derive a Z-plane representation or format that facilitates higher precision and resolution for encoding and/or storing various Z values. In another embodiment, the processor 204 may be configured to perform an algorithm that may provide or generate the Z-plane representations based on one or more factors as discussed above in FIGS. 4-6.

At block 710, storing the encoded Z values to a Z buffer. For example, In this example, the Z-plane representations as described herein may be configured to support un-normalized format and floating point format for storing the encoded Z values to the Z-buffer 224. In this example, high precision and resolution are obtained during storage to the Z-buffer 224.

At block 712, determining relative depths of images based on the encoded Z values.

Figure 8:
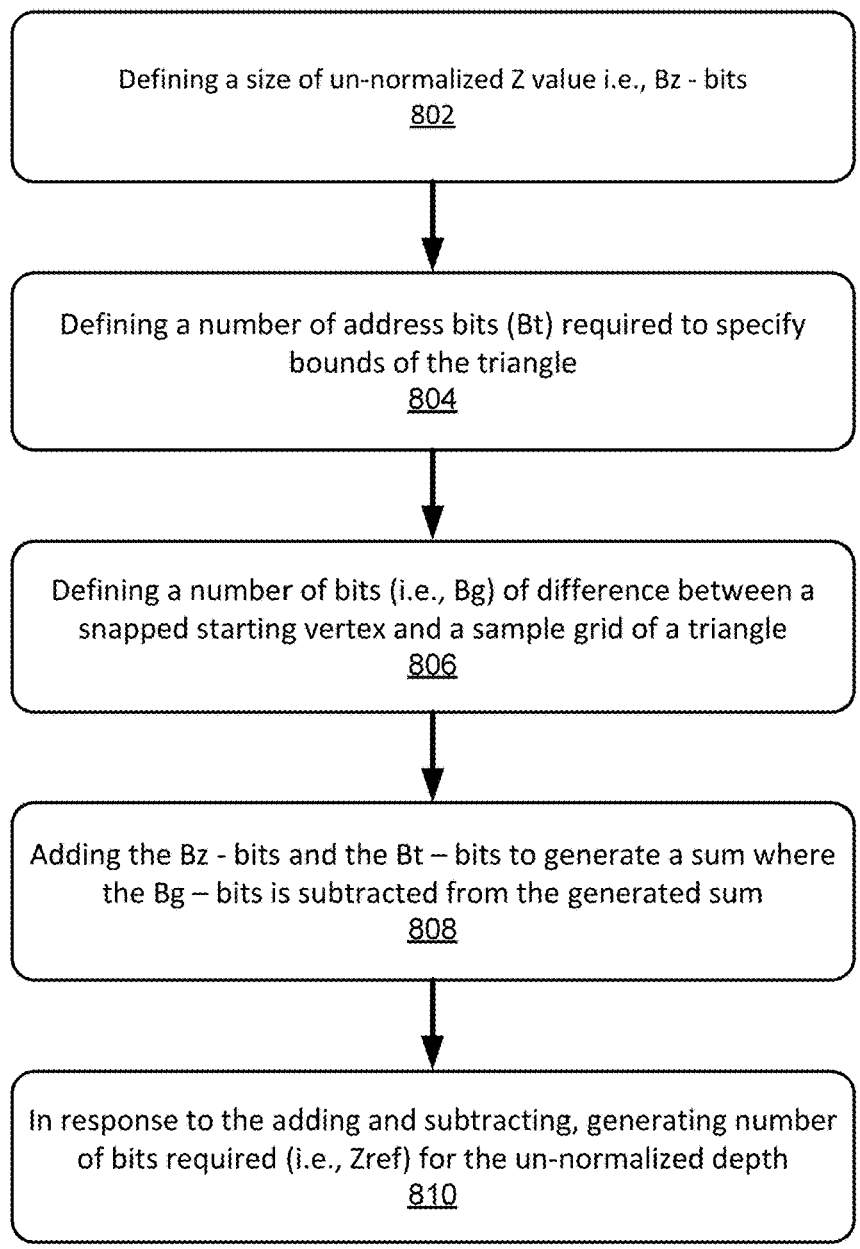
FIG. 8 illustrates an example process illustrating the technology as described herein.

Example Methodological Implementation of Z-Plane Representation for Un-normalized Depth FIG. 8 shows an example process 800 illustrating the technology as described herein. The example process 800 may be implemented as part of a computer graphics system. Furthermore, the process 800 may be implemented to configure a Z-plane representation (e.g., Z-plane representation 400) that may be used for storing encoded Z values to a Z buffer storage (e.g., Z-buffer 224). The storing, for example, may utilize block compression of Z values as described herein.

At block 802, defining a size (i.e., Bz) for un-normalized Z values. For example, let variable "Bz" be a size of the un-normalized Z value in bits (e.g., 24-bits or 16-bits). The "Bz"-bit as described herein is an un-normalized number V that represents a value $V/(2^{Bz}-1)$. As such, the un-normalized Z values may be limited to a range [0.0 . . . 1.0].

At block 804, defining some address bits (Bt) required to specify bounds of a triangle. For example, a snapped starting vertex of a triangle is defined as Xv, Yv, and Zv. In this example, a typical maximum size for vertex coordinates is +-32K pixels with 8-bits of sub-pixel precision. As such, the "Bt" may be computed, for example, as Bt=16+8=24bits.

At block 806, defining some bits (i.e., Bg) of difference between a snapped starting vertex and a sample grid of a triangle. For vertex depths, the vertex depths are typically clamped to the range [0.0 . . . 1.0] while the "X" slope and "Y" slope of a sub-pixel vertex grid has a range [−1.0 . . . 1.0.] In an embodiment, the variable "Bg" includes 4 bits (i.e., Bg=8−4=4-bits).

At block 808, adding the Bz-bits and the Bt-bits to generate a sum where the Bg-bits are subtracted from the generated sum.

At block 810, in response to the adding and subtracting, generating number of bits (Zref) required for the un-normalized depth format. For example, the Zref is implemented to be equal to Zref bits=Bz+Bt+3−Bg. In this example, the Zref is configured to include 47 bits when the variable Bz includes 24 bits (i.e., 24-bit un-normalized depth), the variable Bt includes 24 bits (S15.8 vertex coordinates), and the variable Bg includes 4 bits (sample grid is 16× coarser than the vertex grid).

To ensure that block compression and uncompressed depth interpolation produce the same Z value, the floating point "X" slope and the "Y" slope may be rounded to have no more fractional precision than the Zref. For example, the same depth computation at location (X, Y) may be derived whether the computation includes Z=Zv+X* "X" slope+Y* "Y" slope; or the computation of the Zref at location (Xr, Yr) is first performed in a compression block as Zref=Zv+Xr* "X" slope+Yr* "Y" slope and then the Z is computed as Z=Zref+(X−Xref)*Zslope+(Y−Yref)*"Y" slope.

Accordingly, for the Z-plane representation for 24-bit un-normalized depth may include Zref bits=Bz+Bt+3−Bg. On the other hand, for the "X" slope and "Y" slope as shown in FIG. 4, they are stored in floating point and requires 32-bits each.

With reference to unused bits at group 408 of FIG. 4, the Z-plane representation for 24-bit un-normalized depth may utilize the unused bits for overflow bits when computing the Z values that are outside of the triangle.

Figure 9:
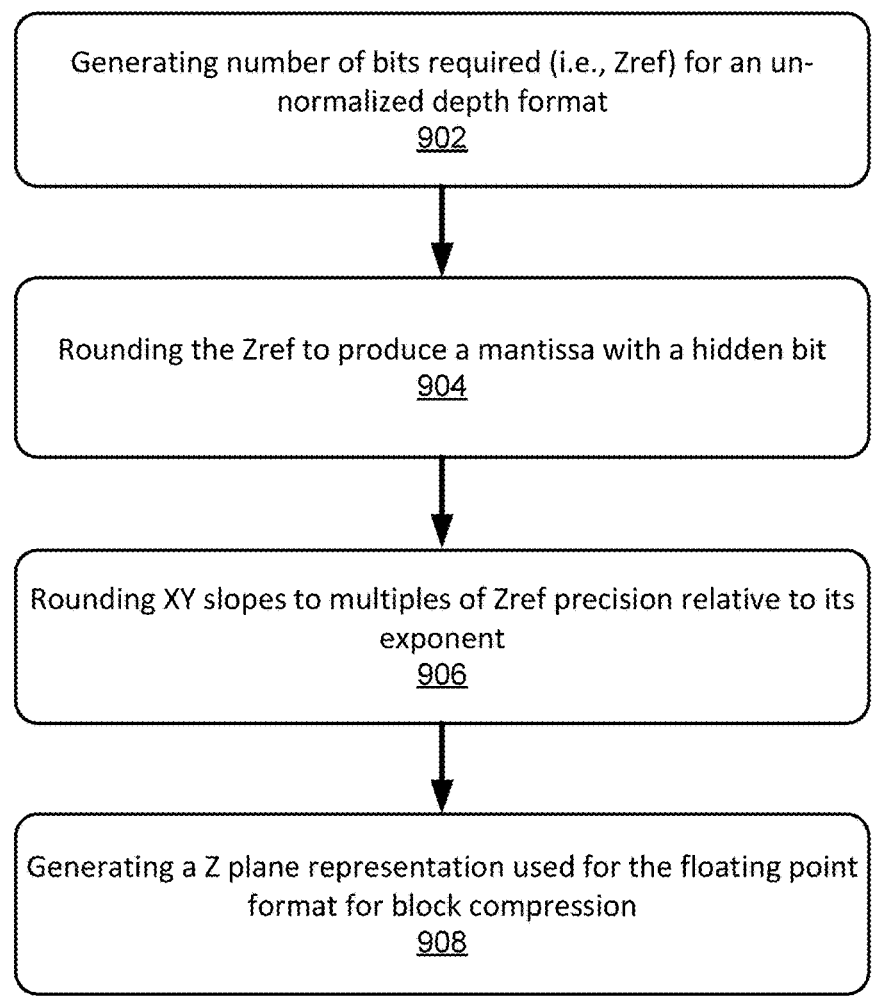
FIG. 9 illustrates an example process illustrating the technology as described herein.

Example Methodological Implementation of Z-Plane Format for Floating Point Format Block Compression FIG. 9 is example process 900 illustrating the technology as described herein. The example process 900 may be implemented as part of a computer graphics system. Furthermore, the process 900 may be implemented to configure a Z-plane representation (e.g., Z-plane representation 500) that may be used for storing encoded Z values to a Z buffer storage (e.g., Z-buffer 224). The storing, for example, may utilize floating point format for block compression of Z values as described herein.

At block 902, generating a number of bits (i.e., Zref) required for an un-normalized depth format. For example, the Zref as derived in the process of FIG. 8, Block 810 may be utilized as the Zref bits in this block 902.

At block 904, rounding the Zref to produce a mantissa with a hidden bit.

At block 906, rounding X and Y slopes to multiples of Zref precision relative to its exponent.

At block 908, generating a Z-plane representation used for the floating point format for block compression. Here, the generated Z-plane representation depth for 32-bit floating point depth with shared slope exponent (e.g., Z-plane representation 500) is similar to the Z-plane representation for a un-normalized bit (e.g., Z-plane representation 400) except for the included 8-bit component.

In the above processes, the Z-plane representations are configured to facilitate high resolution and precision in rendering 3D scenes.

Figure 10:
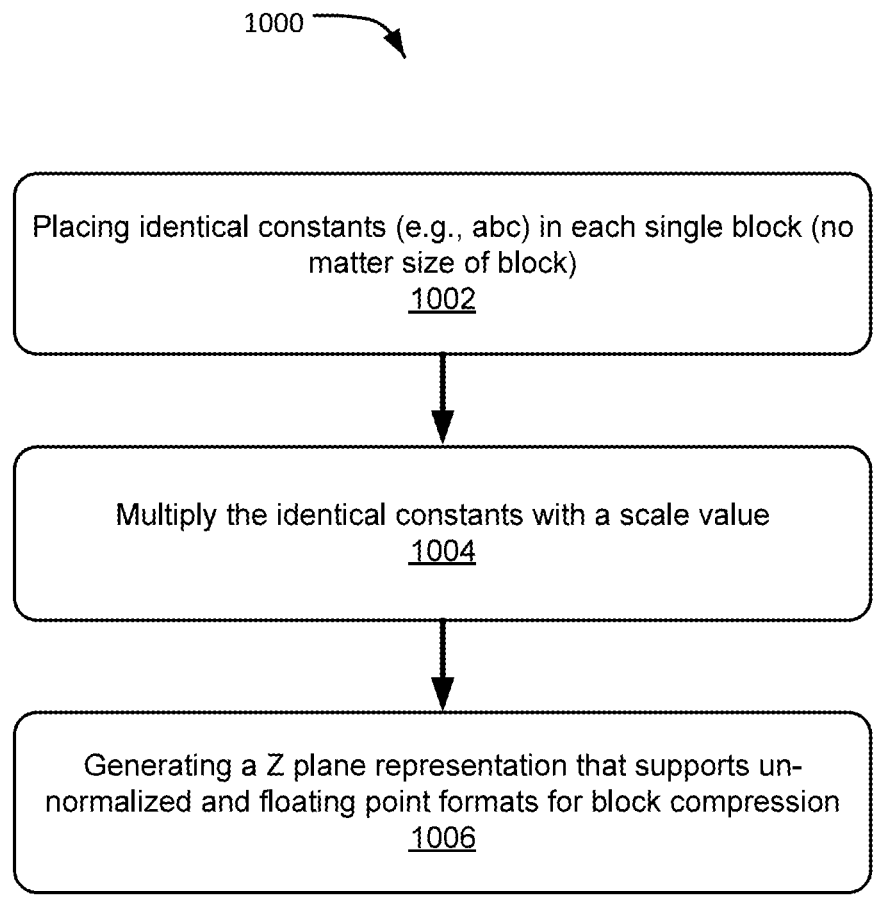
FIG. 10 illustrates an example process illustrating the technology as described herein.

Other Method of Generating the Z-Plane Representation that Supports Un-normalized and Floating-Point Formats FIG. 10 shows an example process 1000 illustrating the technology as described herein. The example process 1000 may be implemented as part of a computer graphics system. The process 1000 is implemented to generate the Z-plane representation for block compression as described herein. The generated Z-plane representation may support un-normalized and floating point formats At block 1002, identical constants are placed in each single block is performed. For example, identical constants "abc" are used in every single block regardless of the size of the block.

At block 1004, multiplying the identical constants with a scale value.

At block 1006, generating a Z-plane representation that supports the un-normalized format and/or floating point format for block compression.

System Overview

Figure 11:
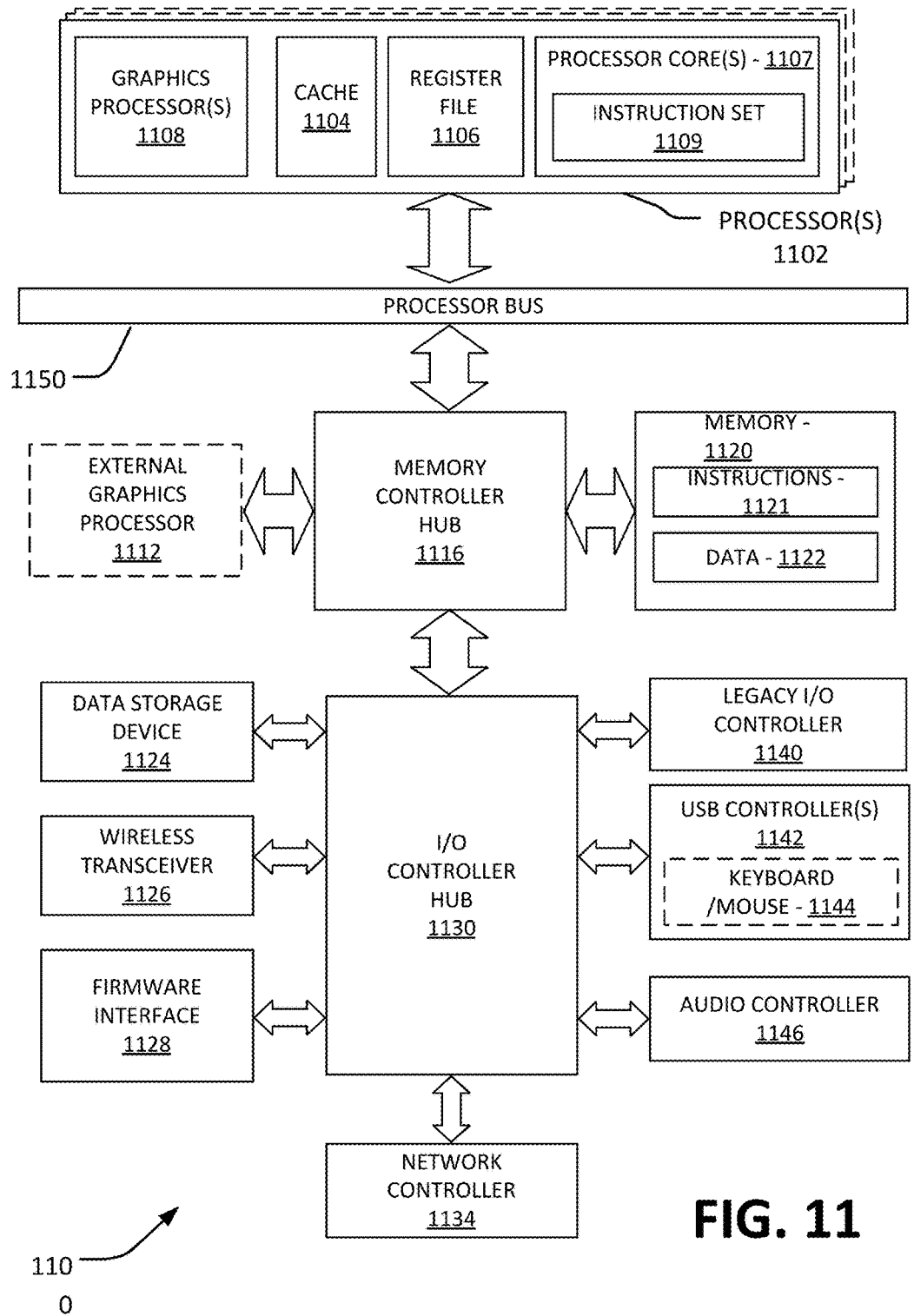
FIG. 11 is a block diagram of a data processing system according to an embodiment.

FIG. 11 is a block diagram of a processing system 1100, according to an embodiment. In various embodiments the system 1100 includes one or more processors 1102 and one or more graphics processors 1108, and may be a single processor desktop system, a multiprocessor workstation system, or a server system having a large number of processors 1102 or processor cores 1107. In one embodiment, the system 1100 is a processing platform incorporated within a system-on-a-chip (SoC) integrated circuit for use in mobile, handheld, or embedded devices.

An embodiment of system 1100 can include, or be incorporated within a server-based gaming platform, a game console, including a game and media console, a mobile gaming console, a handheld game console, or an online game console. In some embodiments system 1100 is a mobile phone, smart phone, tablet computing device or mobile Internet device. Data processing system 1100 can also include, couple with, or be integrated within a wearable device, such as a smart watch wearable device, smart eyewear device, augmented reality device, or virtual reality device. In some embodiments, data processing system 1100 is a television or set top box device having one or more processors 1102 and a graphical interface generated by one or more graphics processors 1108.

In some embodiments, the one or more processors 1102 each include one or more processor cores 1107 to process instructions which, when executed, perform operations for system and user software. In some embodiments, each of the one or more processor cores 1107 is configured to process a specific instruction set 1109. In some embodiments, instruction set 1109 may facilitate Complex Instruction Set Computing (CISC), Reduced Instruction Set Computing (RISC), or computing via a Very Long Instruction Word (VLIW). Multiple processor cores 1107 may each process a different instruction set 1109, which may include instructions to facilitate the emulation of other instruction sets. Processor core 1107 may also include other processing devices, such a Digital Signal Processor (DSP).

In some embodiments, the processor 1102 includes cache memory 1104. Depending on the architecture, the processor 1102 can have a single internal cache or multiple levels of internal cache. In some embodiments, the cache memory is shared among various components of the processor 1102. In some embodiments, the processor 1102 also uses an external cache (e.g., a Level-3 (L3) cache or Last Level Cache (LLC)) (not shown), which may be shared among processor cores 1107 using known cache coherency techniques. A register file 1106 is additionally included in processor 1102 which may include different types of registers for storing different types of data (e.g., integer registers, floating point registers, status registers, and an instruction pointer register). Some registers may be general-purpose registers, while other registers may be specific to the design of the processor 1102.

In some embodiments, processor 1102 is coupled with a processor bus 1110 to transmit communication signals such as address, data, or control signals between processor 1102 and other components in system 1100. In one embodiment the system 1100 uses an exemplary 'hub' system architecture, including a memory controller hub 1116 and an Input Output (I/O) controller hub 1130. A memory controller hub 1116 facilitates communication between a memory device and other components of system 1100, while an I/O Controller Hub (ICH) 1130 provides connections to I/O devices via a local I/O bus. In one embodiment, the logic of the memory controller hub 1116 is integrated within the processor.

Memory device 1120 can be a dynamic random access memory (DRAM) device, a static random access memory (SRAM) device, flash memory device, phase-change memory device, or some other memory device having suitable performance to serve as process memory. In one embodiment the memory device 1120 can operate as system memory for the system 1100, to store data 1122 and instructions 1121 for use when the one or more processors 1102 executes an application or process. Memory controller hub 1116 also couples with an optional external graphics processor 1112, which may communicate with the one or more graphics processors 1108 in processors 1102 to perform graphics and media operations.

In some embodiments, ICH 1130 enables peripherals to connect to memory device 1120 and processor 1102 via a high-speed I/O bus. The I/O peripherals include, but are not limited to, an audio controller 1146, a firmware interface 1128, a wireless transceiver 1126 (e.g., Wi-Fi, Bluetooth), a data storage device 1124 (e.g., hard disk drive, flash memory, etc.), and a legacy I/O controller 1140 for coupling legacy (e.g., Personal System 2 (PS/2)) devices to the system. One or more Universal Serial Bus (USB) controllers 1142 connect input devices, such as keyboard and mouse 1144 combinations. A network controller 1134 may also couple to ICH 1130. In some embodiments, a high-performance network controller (not shown) couples with processor bus 1110. It will be appreciated that the system 1100 shown is exemplary and not limiting, as other types of data processing systems that are differently configured may also be used. For example, the I/O controller hub 1130 may be integrated within the one or more processor 1102, or the memory controller hub 1116 and I/O controller hub 1130 may be integrated into a discreet external graphics processor, such as the external graphics processor 1112.

Figure 12:
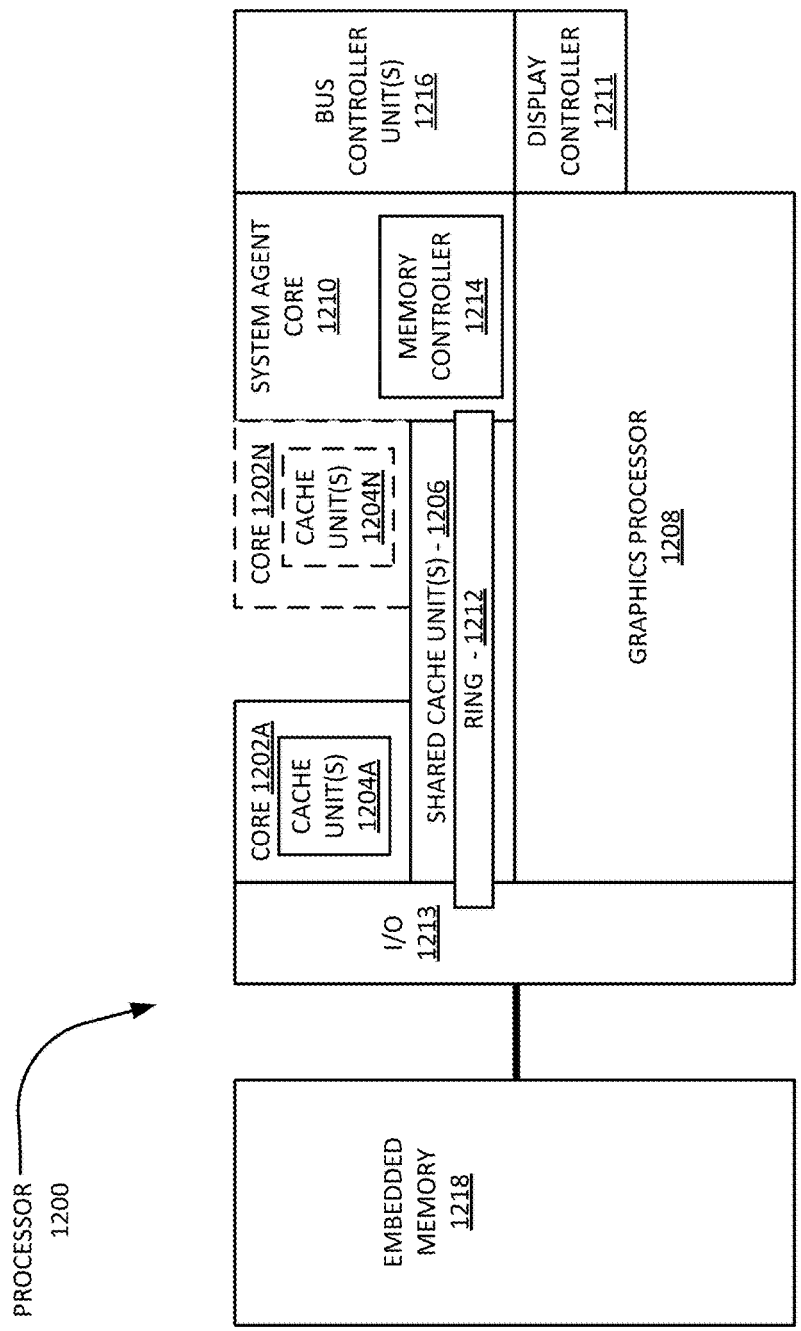
FIG. 12 is a block diagram of an embodiment of a processor having one or more processor cores, an integrated memory controller, and an integrated graphics processor.

FIG. 12 is a block diagram of an embodiment of a processor 1200 having one or more processor cores 1202A-1202N, an integrated memory controller 1214, and an integrated graphics processor 1208. Those elements of FIG. 12 having the same reference numbers (or names) as the elements of any other figure herein can operate or function in any manner similar to that described elsewhere herein, but are not limited to such. Processor 1200 can include additional cores up to and including additional core 1202N represented by the dashed lined boxes. Each of processor cores 1202A-1202N includes one or more internal cache units 1204A-1204N. In some embodiments each processor core also has access to one or more shared cached units 1206.

The internal cache units 1204A-1204N and shared cache units 1206 represent a cache memory hierarchy within the processor 1200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 1206 and 1204A-1204N.

In some embodiments, processor 1200 may also include a set of one or more bus controller units 1216 and a system agent core 1210. The one or more bus controller units 1216 manage a set of peripheral buses, such as one or more Peripheral Component Interconnect buses (e.g., PCI, PCI Express). System agent core 1210 provides management functionality for the various processor components. In some embodiments, system agent core 1210 includes one or more integrated memory controllers 1214 to manage access to various external memory devices (not shown).

In some embodiments, one or more of the processor cores 1202A-1202N include support for simultaneous multi-threading. In such embodiment, the system agent core 1210 includes components for coordinating and operating cores 1202A-1202N during multi-threaded processing. System agent core 1210 may additionally include a power control unit (PCU), which includes logic and components to regulate the power state of processor cores 1202A-1202N and graphics processor 1208.

In some embodiments, processor 1200 additionally includes graphics processor 1208 to execute graphics processing operations. In some embodiments, the graphics processor 1208 couples with the set of shared cache units 1206, and the system agent core 1210, including the one or more integrated memory controllers 1214. In some embodiments, a display controller 1211 is coupled with the graphics processor 1208 to drive graphics processor output to one or more coupled displays. In some embodiments, display controller 1211 may be a separate module coupled with the graphics processor via at least one interconnect, or may be integrated within the graphics processor 1208 or system agent core 1210.

In some embodiments, a ring based interconnect unit 1212 is used to couple the internal components of the processor 1200. However, an alternative interconnect unit may be used, such as a point-to-point interconnect, a switched interconnect, or other techniques, including techniques well known in the art. In some embodiments, graphics processor 1208 couples with the ring interconnect 1212 via an I/O link 1213.

The exemplary I/O link 1213 represents at least one of multiple varieties of I/O interconnects, including an on package I/O interconnect which facilitates communication between various processor components and a high-performance embedded memory module 1218, such as an eDRAM module. In some embodiments, each of the processor cores 1202A-1202N and graphics processor 1208 use embedded memory modules 1218 as a shared Last Level Cache.

In some embodiments, processor cores 1202A-1202N are homogenous cores executing the same instruction set architecture. In another embodiment, processor cores 1202A-1202N are heterogeneous in terms of instruction set architecture (ISA), where one or more of processor cores 1202A-N execute a first instruction set, while at least one of the other cores executes a subset of the first instruction set or a different instruction set. In one embodiment processor cores 1202A-1202N are heterogeneous in terms of microarchitecture, where one or more cores having a relatively higher power consumption couple with one or more power cores having a lower power consumption. Additionally, processor 1200 can be implemented on one or more chips or as an SoC integrated circuit having the illustrated components, in addition to other components.

Figure 13:
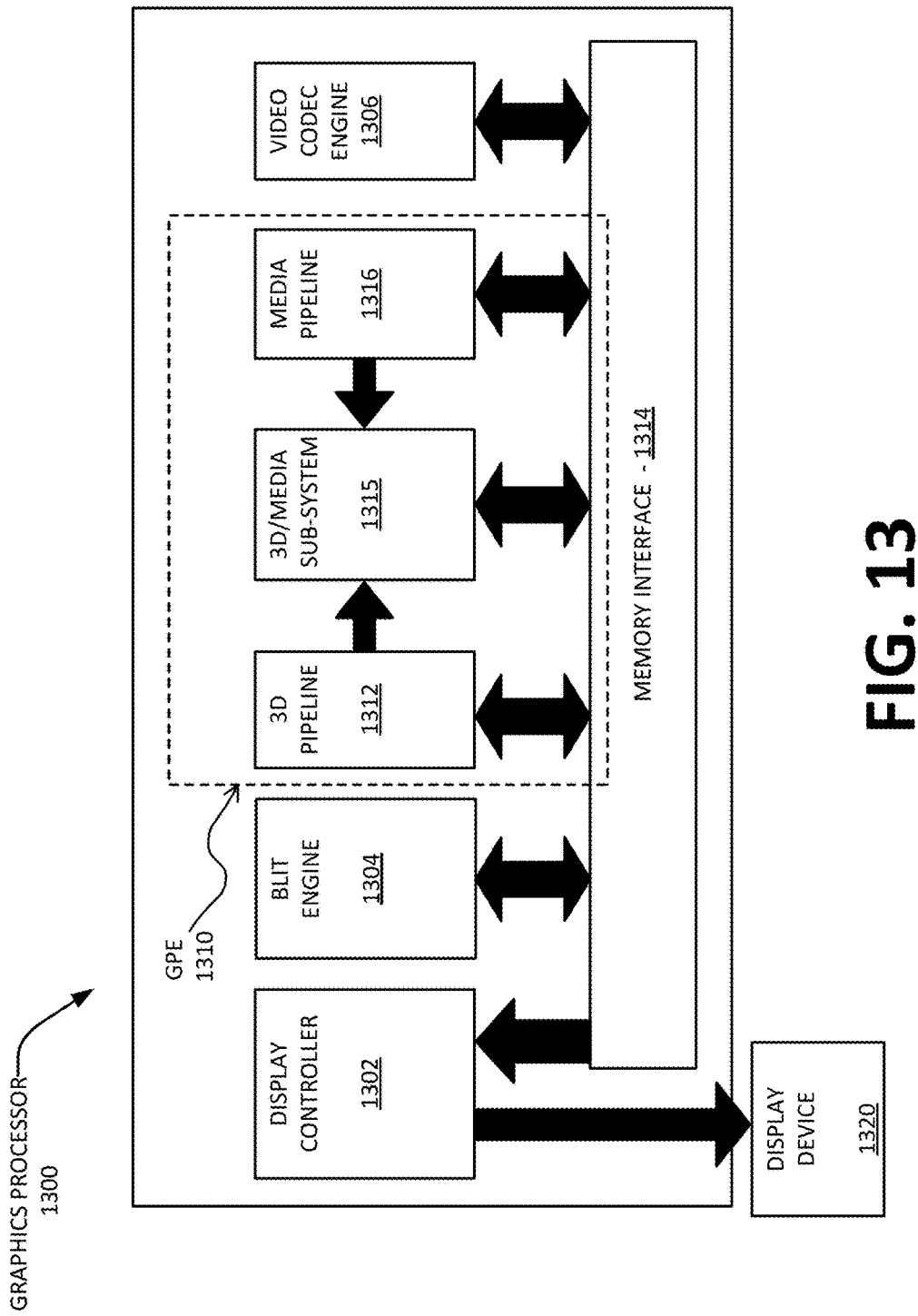
FIG. 13 is a block diagram of one embodiment of a graphics processor which may be a discrete graphics processing unit, or may be graphics processor integrated with a plurality of processing cores.

FIG. 13 is a block diagram of a graphics processor 1300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1300 includes a memory interface 1314 to access memory. Memory interface 1314 can be an interface to local memory, one or more internal caches, one or more shared external caches, and/or to system memory.

In some embodiments, graphics processor 1300 also includes a display controller 1302 to drive display output data to a display device 1320. Display controller 1302 includes hardware for one or more overlay planes for the display and composition of multiple layers of video or user interface elements. In some embodiments, graphics processor 1300 includes a video codec engine 1306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 1300 includes a block image transfer (BLIT) engine 1304 to perform two-dimensional (2D) rasterizer operations including, for example, bit-boundary block transfers. However, in one embodiment, 2D graphics operations are performed using one or more components of graphics processing engine (GPE) 1310. In some embodiments, GPE 1310 is a compute engine for performing graphics operations, including three-dimensional (3D) graphics operations and media operations.

In some embodiments, GPE 1310 includes a 3D pipeline 1312 for performing 3D operations, such as rendering three-dimensional images and scenes using processing functions that act upon 3D primitive shapes (e.g., rectangle, triangle, etc.). The 3D pipeline 1312 includes programmable and fixed function elements that perform various tasks within the element and/or spawn execution threads to a 3D/Media sub-system 1315. While 3D pipeline 1312 can be used to perform media operations, an embodiment of GPE 1310 also includes a media pipeline 1316 that is specifically used to perform media operations, such as video post-processing and image enhancement.

In some embodiments, media pipeline 1316 includes fixed function or programmable logic units to perform one or more specialized media operations, such as video decode acceleration, video de-interlacing, and video encode acceleration in place of, or on behalf of video codec engine 1306. In some embodiments, media pipeline 1316 additionally includes a thread spawning unit to spawn threads for execution on 3D/Media sub-system 1315. The spawned threads perform computations for the media operations on one or more graphics execution units included in 3D/Media subsystem 1315.

In some embodiments, 3D/Media subsystem 1315 includes logic for executing threads spawned by 3D pipeline 1312 and media pipeline 1316. In one embodiment, the pipelines send thread execution requests to 3D/Media subsystem 1315, which includes thread dispatch logic for arbitrating and dispatching the various requests to available thread execution resources. The execution resources include an array of graphics execution units to process the 3D and media threads. In some embodiments, 3D/Media subsystem 1315 includes one or more internal caches for thread instructions and data. In some embodiments, the subsystem also includes shared memory, including registers and addressable memory, to share data between threads and to store output data.

Graphics Processing Engine

Figure 14:
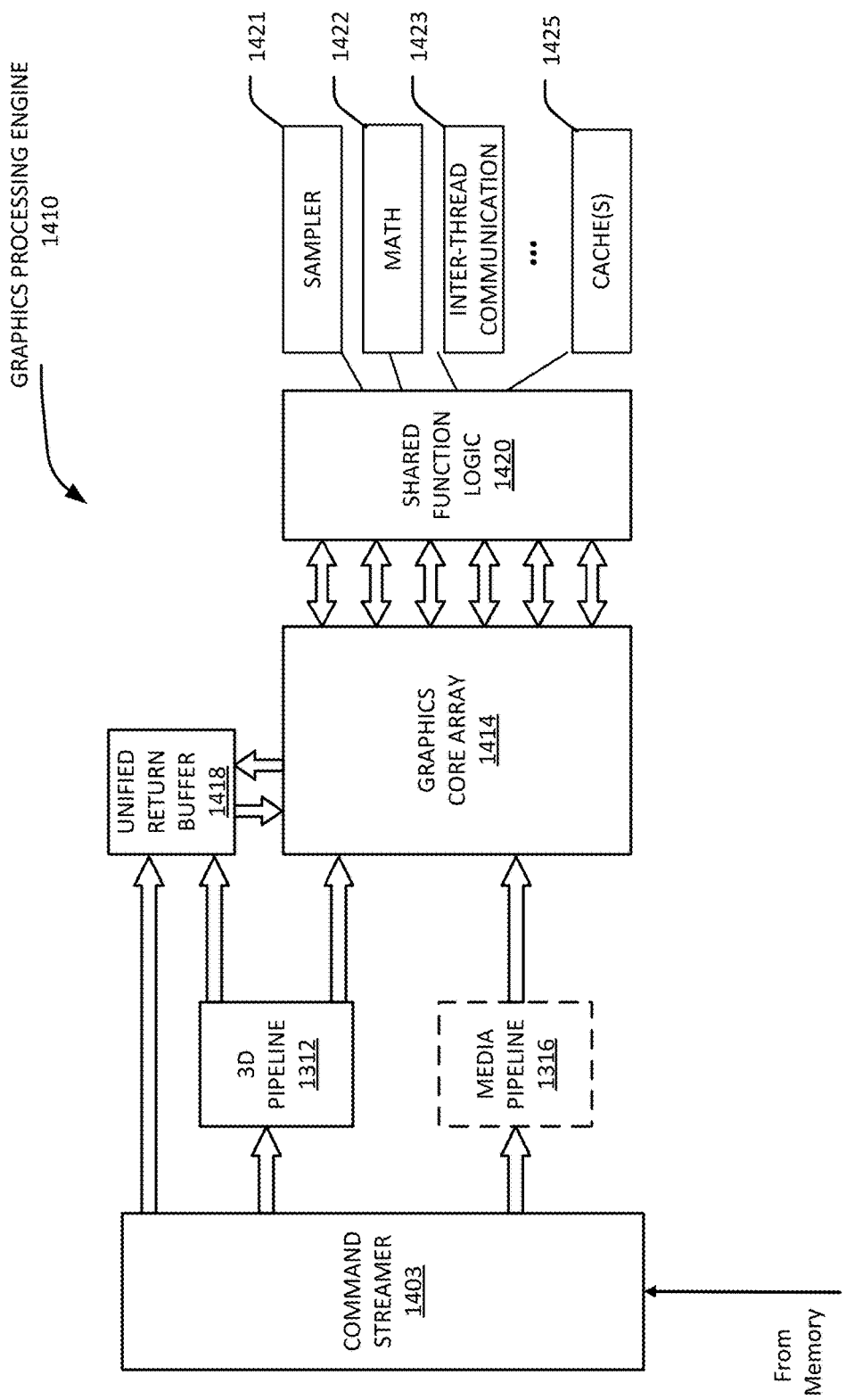
FIG. 14 is a block diagram of an embodiment of a graphics processing engine for a graphics processor.

FIG. 14 is a block diagram of a graphics processing engine 1410 of a graphics processor in accordance with some embodiments. In one embodiment, the graphics processing engine (GPE) 1410 is a version of the GPE 1310 shown in FIG. 13. Elements of FIG. 14 having the same reference numbers (or names) as the elements of any other figure herein can operate or function in any manner similar to that described elsewhere herein, but are not limited to such. For example, the 3D pipeline 1312 and media pipeline 1316 of FIG. 13 are illustrated. The media pipeline 1316 is optional in some embodiments of the GPE 1410 and may not be explicitly included within the GPE 1410. For example and in at least one embodiment, a separate media and/or image processor is coupled to the GPE 1410.

In some embodiments, GPE 1410 couples with or includes a command streamer 1403, which provides a command stream to the 3D pipeline 1312 and/or media pipelines 1316. In some embodiments, command streamer 1403 is coupled with memory, which can be system memory, or one or more of internal cache memory and shared cache memory. In some embodiments, command streamer 1403 receives commands from the memory and sends the commands to 3D pipeline 1312 and/or media pipeline 1316. The commands are directives fetched from a ring buffer, which stores commands for the 3D pipeline 1312 and media pipeline 1316. In one embodiment, the ring buffer can additionally include batch command buffers storing batches of multiple commands. The commands for the 3D pipeline 1312 can also include references to data stored in memory, such as but not limited to vertex and geometry data for the 3D pipeline 1312 and/or image data and memory objects for the media pipeline 1316. The 3D pipeline 1312 and media pipeline 1316 process the commands and data by performing operations via logic within the respective pipelines or by dispatching one or more execution threads to a graphics core array 1414.

In various embodiments the 3D pipeline 1312 can execute one or more shader programs, such as vertex shaders, geometry shaders, pixel shaders, fragment shaders, compute shaders, or other shader programs, by processing the instructions and dispatching execution threads to the graphics core array 1414. The graphics core array 1414 provides a unified block of execution resources. Multi-purpose execution logic (e.g., execution units) within the graphic core array 1414 includes support for various 3D API shader languages and can execute multiple simultaneous execution threads associated with multiple shaders.

In some embodiments the graphics core array 1414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 1107 of FIG. 11 or core 1202A-1202N as in FIG. 12.

Output data generated by threads executing on the graphics core array 1414 can output data to memory in a unified return buffer (URB) 1418. The URB 1418 can store data for multiple threads. In some embodiments the URB 1418 may be used to send data between different threads executing on the graphics core array 1414. In some embodiments the URB 1418 may additionally be used for synchronization between threads on the graphics core array and fixed function logic within the shared function logic 1420.

In some embodiments, graphics core array 1414 is scalable, such that the array includes a variable number of graphics cores, each having a variable number of execution units based on the target power and performance level of GPE 1410. In one embodiment the execution resources are dynamically scalable, such that execution resources may be enabled or disabled as needed.

The graphics core array 1414 couples with shared function logic 1420 that includes multiple resources that are shared between the graphics cores in the graphics core array. The shared functions within the shared function logic 1420 are hardware logic units that provide specialized supplemental functionality to the graphics core array 1414. In various embodiments, shared function logic 1420 includes but is not limited to sampler 1421, math 1422, and inter-thread communication (ITC) 1423 logic. Additionally, some embodiments implement one or more cache(s) 1425 within the shared function logic 1420. A shared function is implemented where the demand for a given specialized function is insufficient for inclusion within the graphics core array 1414. Instead a single instantiation of that specialized function is implemented as a stand-alone entity in the shared function logic 1420 and shared among the execution resources within the graphics core array 1414. The precise set of functions that are shared between the graphics core array 1414 and included within the graphics core array 1414 varies between embodiments.

Figure 15:
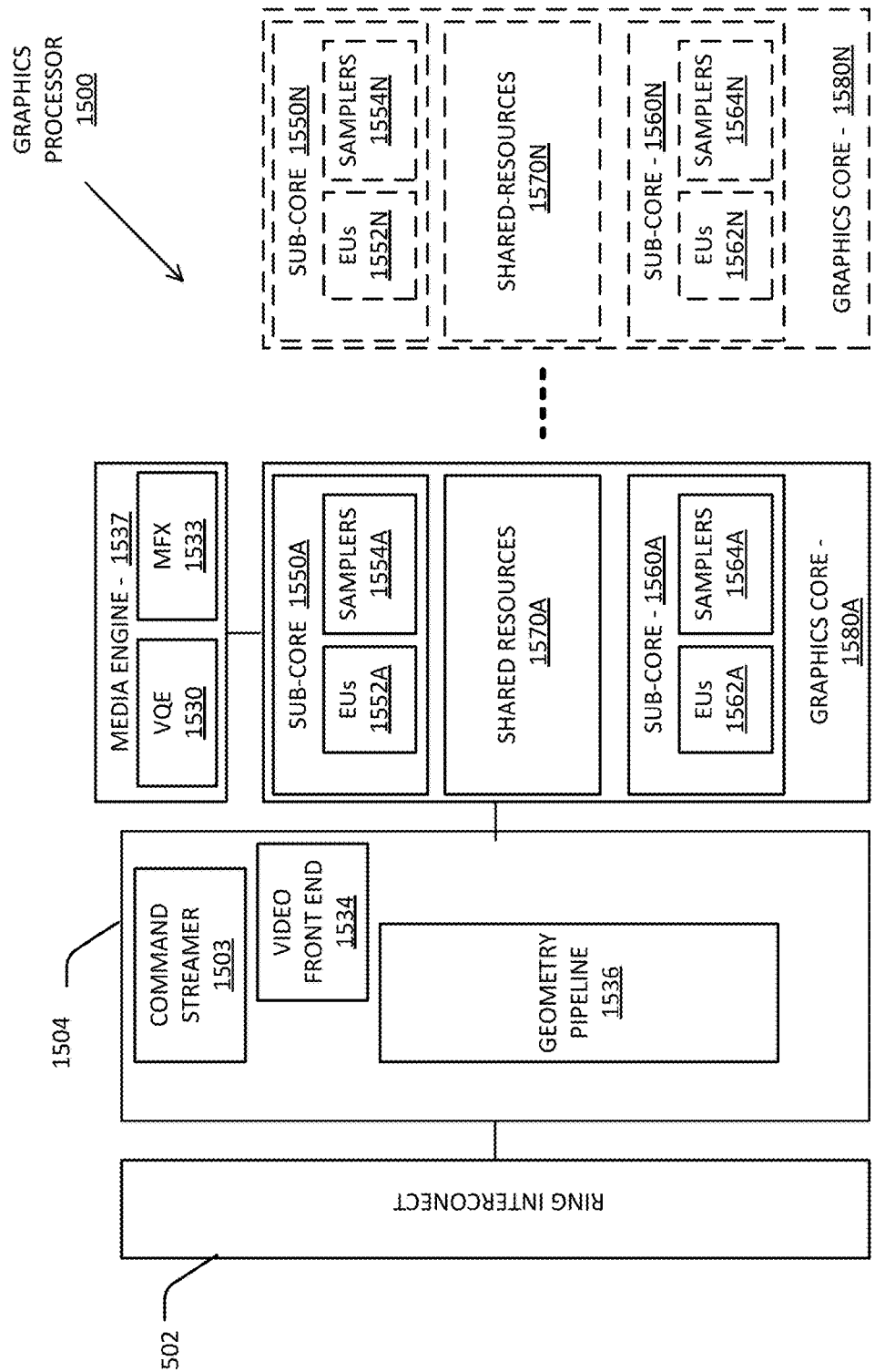
FIG. 15 is a block diagram of another embodiment of a graphics processor.

FIG. 15 is a block diagram of another embodiment of a graphics processor 1500. Elements of FIG. 15 having the same reference numbers (or names) as the elements of any other figure herein can operate or function in any manner similar to that described elsewhere herein, but are not limited to such.

In some embodiments, graphics processor 1500 includes a ring interconnect 1502, a pipeline front-end 1504, a media engine 1537, and graphics cores 1580A-1580N. In some embodiments, ring interconnect 1502 couples the graphics processor to other processing units, including other graphics processors or one or more general-purpose processor cores. In some embodiments, the graphics processor is one of many processors integrated within a multi-core processing system.

In some embodiments, graphics processor 1500 receives batches of commands via ring interconnect 1502. The incoming commands are interpreted by a command streamer 1503 in the pipeline front-end 1504. In some embodiments, graphics processor 1500 includes scalable execution logic to perform 3D geometry processing and media processing via the graphics core(s) 1580A-1580N. For 3D geometry processing commands, command streamer 1503 supplies commands to geometry pipeline 1536. For at least some media processing commands, command streamer 1503 supplies the commands to a video front end 1534, which couples with a media engine 1537. In some embodiments, media engine 1537 includes a Video Quality Engine (VQE) 1530 for video and image post-processing and a multi-format encode/decode (MFX) 1533 engine to provide hardware-accelerated media data encode and decode. In some embodiments, geometry pipeline 1536 and media engine 1537 each generate execution threads for the thread execution resources provided by at least one graphics core 1580A.

In some embodiments, graphics processor 1500 includes scalable thread execution resources featuring modular cores 1580A-1580N (sometimes referred to as core slices), each having multiple sub-cores 1550A-1550N, 1560A-1560N (sometimes referred to as core sub-slices). In some embodiments, graphics processor 1500 can have any number of graphics cores 1580A through 1580N. In some embodiments, graphics processor 1500 includes a graphics core 1580A having at least a first sub-core 1550A and a second sub-core 1560A. In other embodiments, the graphics processor is a low power processor with a single sub-core (e.g., 1550A). In some embodiments, graphics processor 1500 includes multiple graphics cores 1580A-1580N, each including a set of first sub-cores 1550A-1550N and a set of second sub-cores 1560A-1560N. Each sub-core in the set of first sub-cores 1550A-1550N includes at least a first set of execution units 1552A-1552N and media/texture samplers 1554A-1554N. Each sub-core in the set of second sub-cores 1560A-1560N includes at least a second set of execution units 1562A-1562N and samplers 1564A-1564N. In some embodiments, each sub-core 1550A-1550N, 1560A-1560N shares a set of shared resources 1570A-1570N. In some embodiments, the shared resources include shared cache memory and pixel operation logic. Other shared resources may also be included in the various embodiments of the graphics processor.

Execution Units

Figure 16:
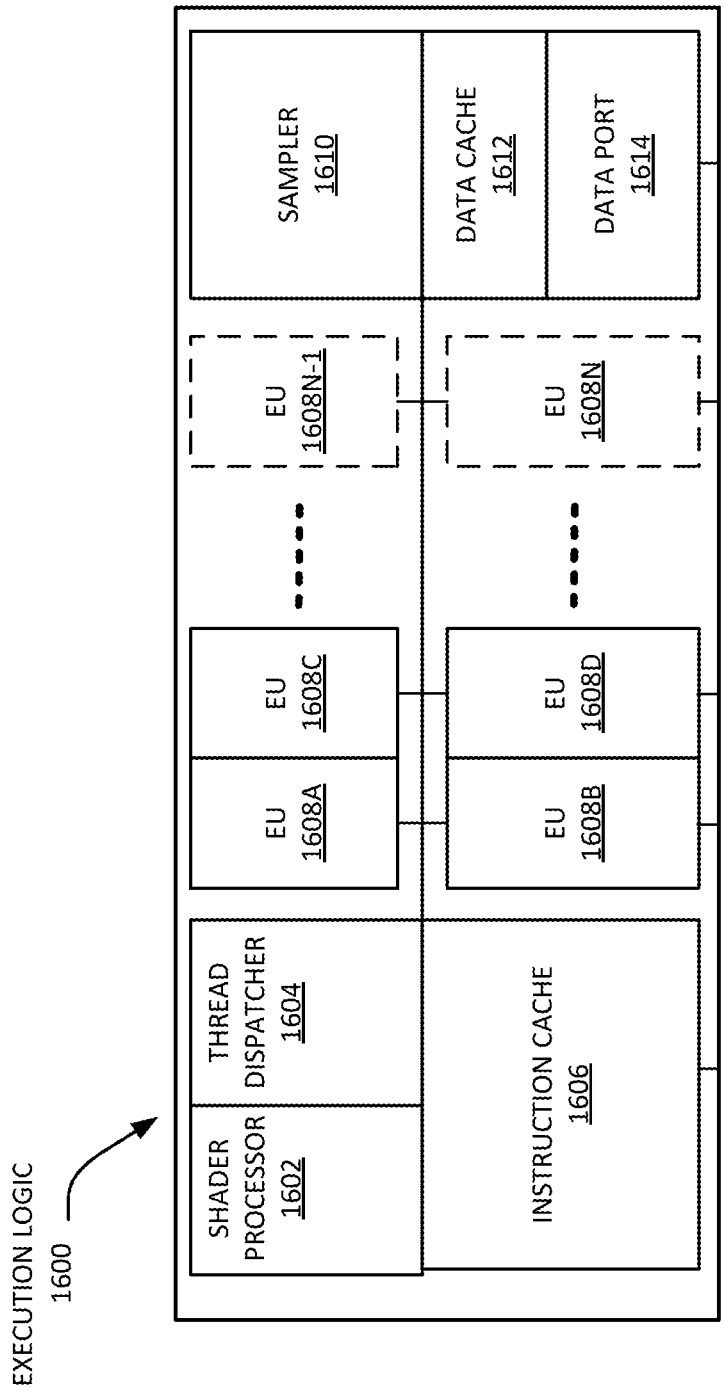
FIG. 16 illustrates thread execution logic including an array of processing elements employed in one embodiment of a graphics processing engine.

FIG. 16 illustrates thread execution logic 1600 including an array of processing elements employed in some embodiments of a GPE. Elements of FIG. 16 having the same reference numbers (or names) as the elements of any other figure herein can operate or function in any manner similar to that described elsewhere herein, but are not limited to such.

In some embodiments, thread execution logic 1600 includes a shader processor 1602, a thread dispatcher 1604, instruction cache 1606, a scalable execution unit array including a plurality of execution units 1608A-1608N, a sampler 1610, a data cache 1612, and a data port 1614. In one embodiment the scalable execution unit array can dynamically scale by enabling or disabling one or more execution units (e.g., any of execution unit 1608A, 1608B, 1608C, 1608D, through 1608N-1 and 1608N) based on the computational requirements of a workload. In one embodiment the included components are interconnected via an interconnect fabric that links to each of the components. In some embodiments, thread execution logic 1600 includes one or more connections to memory, such as system memory or cache memory, through one or more of instruction cache 1606, data port 1614, sampler 1610, and execution units 1608A-1608N. In some embodiments, each execution unit (e.g. 1608A) is a stand-alone programmable general purpose computational unit that is capable of executing multiple simultaneous hardware threads while processing multiple data elements in parallel for each thread. In various embodiments, the array of execution units 1608A-1608N is scalable to include any number individual execution units.

In some embodiments, the execution units 1608A-608N are primarily used to execute shader programs. A shader processor 1602 can process the various shader programs and dispatch execution threads associated with the shader programs via a thread dispatcher 1604. In one embodiment the thread dispatcher includes logic to arbitrate thread initiation requests from the graphics and media pipelines and instantiate the requested threads on one or more execution unit in the execution units 1608A-1608N. For example, the geometry pipeline (e.g., 1536 of FIG. 15) can dispatch vertex, tessellation, or geometry shaders to the thread execution logic 1600 (FIG. 16) for processing. In some embodiments, thread dispatcher 1604 can also process runtime thread spawning requests from the executing shader programs.

In some embodiments, the execution units 1608A-1608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 1608A-1608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 1608A-1608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 1608A-1608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 1608A-1608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 1606) are included in the thread execution logic 1600 to cache thread instructions for the execution units. In some embodiments, one or more data caches (e.g., 1612) are included to cache thread data during thread execution. In some embodiments, a sampler 1610 is included to provide texture sampling for 3D operations and media sampling for media operations. In some embodiments, sampler 1610 includes specialized texture or media sampling functionality to process texture or media data during the sampling process before providing the sampled data to an execution unit.

During execution, the graphics and media pipelines send thread initiation requests to thread execution logic 1600 via thread spawning and dispatch logic. Once a group of geometric objects has been processed and rasterized into pixel data, pixel processor logic (e.g., pixel shader logic, fragment shader logic, etc.) within the shader processor 1602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 1602 then executes an application programming interface (API)-supplied pixel or fragment shader program. To execute the shader program, the shader processor 1602 dispatches threads to an execution unit (e.g., 1608A) via thread dispatcher 1604. In some embodiments, pixel shader 1602 uses texture sampling logic in the sampler 1610 to access texture data in texture maps stored in memory. Arithmetic operations on the texture data and the input geometry data compute pixel color data for each geometric fragment, or discards one or more pixels from further processing.

In some embodiments, the data port 1614 provides a memory access mechanism for the thread execution logic 1600 output processed data to memory for processing on a graphics processor output pipeline. In some embodiments, the data port 1614 includes or couples with one or more cache memories (e.g., data cache 1612) to cache data for memory access via the data port.

Figure 17:
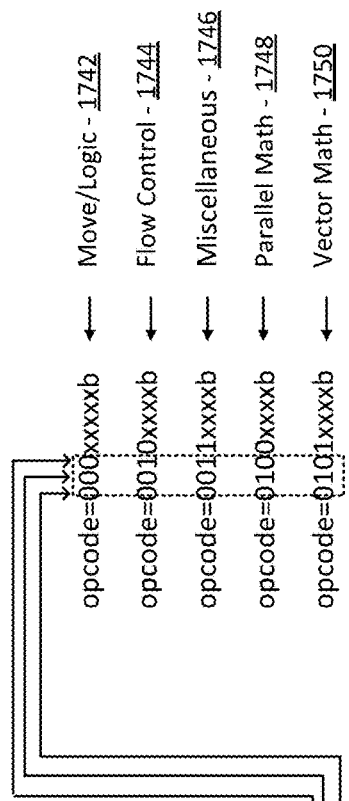
FIG. 17 is a block diagram illustrating a graphics processor execution unit instruction format according to an embodiment.

FIG. 17 is a block diagram illustrating a graphics processor instruction formats 1700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 1700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 1710. A 64-bit compacted instruction format 1730 is available for some instructions based on the selected instruction, instruction options, and number of operands. The native 128-bit instruction format 1710 provides access to all instruction options, while some options and operations are restricted in the 64-bit format 1730. The native instructions available in the 64-bit format 1730 vary by embodiment. In some embodiments, the instruction is compacted in part using a set of index values in an index field 1713. The execution unit hardware references a set of compaction tables based on the index values and uses the compaction table outputs to reconstruct a native instruction in the 128-bit instruction format 1710.

For each format, instruction opcode 1712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 1714 enables control over certain execution options, such as channels selection (e.g., predication) and data channel order (e.g., swizzle). For instructions in the 128-bit instruction format 1710 an exec-size field 1716 limits the number of data channels that will be executed in parallel. In some embodiments, exec-size field 1716 is not available for use in the 64-bit compact instruction format 1730.

Some execution unit instructions have up to three operands including two source operands, src0 1720, src1 1722, and one destination 1718. In some embodiments, the execution units support dual destination instructions, where one of the destinations is implied. Data manipulation instructions can have a third source operand (e.g., SRC2 1724), where the instruction opcode 1712 determines the number of source operands. An instruction's last source operand can be an immediate (e.g., hard-coded) value passed with the instruction.

In some embodiments, the 128-bit instruction format 1710 includes an access/address mode field 1726 specifying, for example, whether direct register addressing mode or indirect register addressing mode is used. When direct register addressing mode is used, the register address of one or more operands is directly provided by bits in the instruction.

In some embodiments, the 128-bit instruction format 1710 includes an access/address mode field 1726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 1726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 1712 bit-fields to simplify Opcode decode 1740. For an 8-bit opcode, bits 4, 5, and 6 allow the execution unit to determine the type of opcode. The precise opcode grouping shown is merely an example. In some embodiments, a move and logic opcode group 1742 includes data movement and logic instructions (e.g., move (mov), compare (cmp)). In some embodiments, move and logic group 1742 shares the five most significant bits (MSB), where move (mov) instructions are in the form of 0000xxxxb and logic instructions are in the form of 0001xxxxb. A flow control instruction group 1744 (e.g., call, jump (jmp)) includes instructions in the form of 0010xxxxb (e.g., 0x20). A miscellaneous instruction group 1746 includes a mix of instructions, including synchronization instructions (e.g., wait, send) in the form of 0011xxxxb (e.g., 0x30). A parallel math instruction group 1748 includes component-wise arithmetic instructions (e.g., add, multiply (mul)) in the form of 0100xxxxb (e.g., 0x40). The parallel math group 1748 performs the arithmetic operations in parallel across data channels. The vector math group 1750 includes arithmetic instructions (e.g., dp4) in the form of 0101xxxxb (e.g., 0x50). The vector math group performs arithmetic such as dot product calculations on vector operands.

Graphics Pipeline

Figure 18:
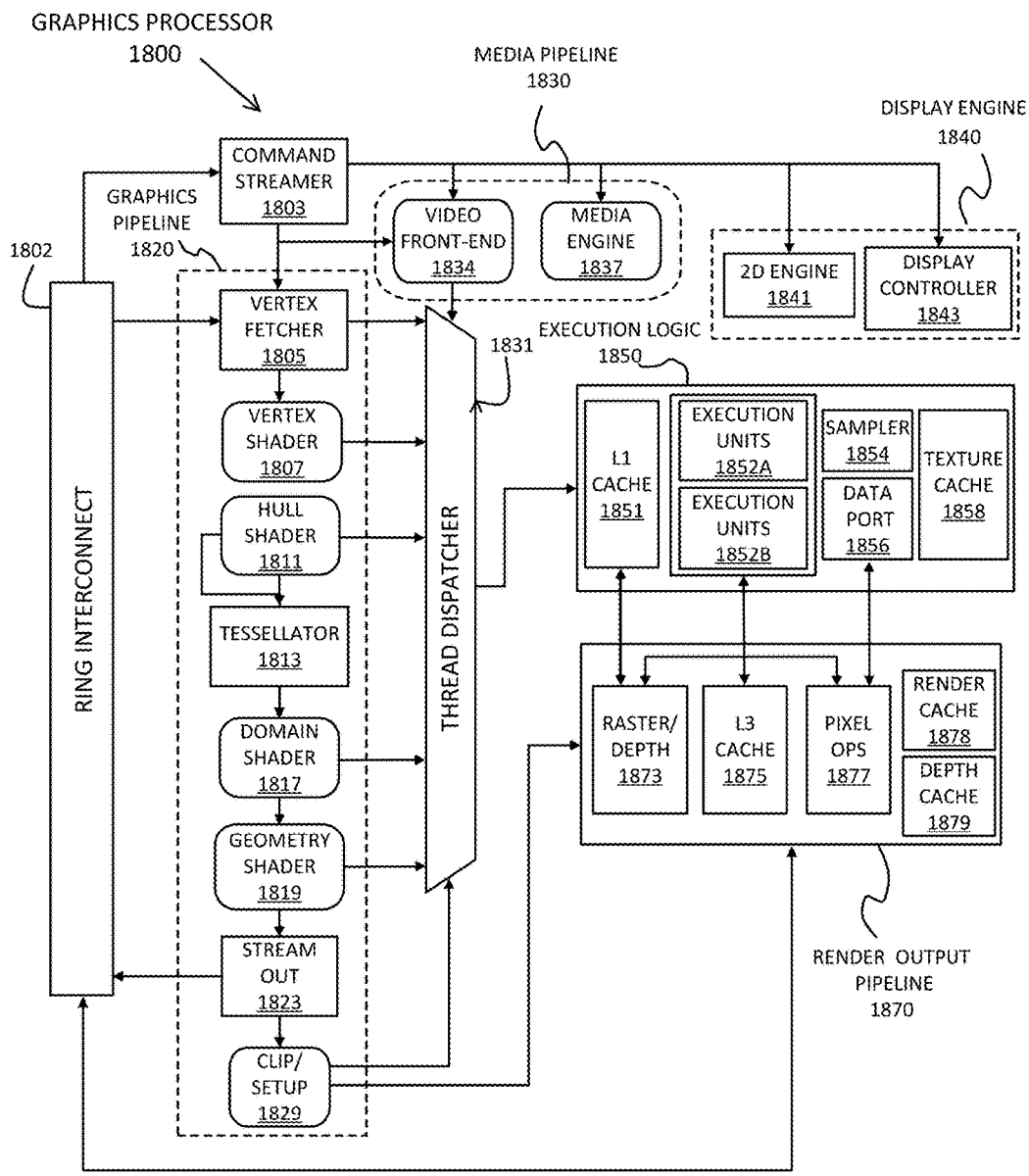
FIG. 18 is a block diagram of another embodiment of a graphics processor which includes a graphics pipeline, a media pipeline, a display engine, thread execution logic, and a render output pipeline.

FIG. 18 is a block diagram of another embodiment of a graphics processor 1800. Elements of FIG. 18 having the same reference numbers (or names) as the elements of any other figure herein can operate or function in any manner similar to that described elsewhere herein, but are not limited to such.

In some embodiments, graphics processor 1800 includes a graphics pipeline 1820, a media pipeline 1830, a display engine 1840, thread execution logic 1850, and a render output pipeline 1870. In some embodiments, graphics processor 1800 is a graphics processor within a multi-core processing system that includes one or more general purpose processing cores. The graphics processor is controlled by register writes to one or more control registers (not shown) or via commands issued to graphics processor 1800 via a ring interconnect 1802. In some embodiments, ring interconnect 1802 couples graphics processor 1800 to other processing components, such as other graphics processors or general-purpose processors. Commands from ring interconnect 1802 are interpreted by a command streamer 1803, which supplies instructions to individual components of graphics pipeline 1820 or media pipeline 1830.

In some embodiments, command streamer 1803 directs the operation of a vertex fetcher 1805 that reads vertex data from memory and executes vertex-processing commands provided by command streamer 1803. In some embodiments, vertex fetcher 1805 provides vertex data to a vertex shader 1807, which performs coordinate space transformation and lighting operations to each vertex. In some embodiments, vertex fetcher 1805 and vertex shader 1807 execute vertex-processing instructions by dispatching execution threads to execution units 1852A-1852B via a thread dispatcher 1831.

In some embodiments, execution units 1852A-1852B are an array of vector processors having an instruction set for performing graphics and media operations. In some embodiments, execution units 1852A, 1852B have an attached L1 cache 1851 that is specific for each array or shared between the arrays. The cache can be configured as a data cache, an instruction cache, or a single cache that is partitioned to contain data and instructions in different partitions.

In some embodiments, graphics pipeline 1820 includes tessellation components to perform hardware-accelerated tessellation of 3D objects. In some embodiments, a programmable hull shader 1811 configures the tessellation operations. A programmable domain shader 1817 provides back-end evaluation of tessellation output. A tessellator 1813 operates at the direction of hull shader 1811 and contains special purpose logic to generate a set of detailed geometric objects based on a coarse geometric model that is provided as input to graphics pipeline 1820. In some embodiments, if tessellation is not used, tessellation components (e.g., hull shader 1811, tessellator 1813, and domain shader 1817) can be bypassed.

In some embodiments, complete geometric objects can be processed by a geometry shader 1819 via one or more threads dispatched to execution units 1852A, 1852B, or can proceed directly to the clipper 1829. In some embodiments, the geometry shader operates on entire geometric objects, rather than vertices or patches of vertices as in previous stages of the graphics pipeline. If the tessellation is disabled the geometry shader 1819 receives input from the vertex shader 1807. In some embodiments, geometry shader 1819 is programmable by a geometry shader program to perform geometry tessellation if the tessellation units are disabled.

Before rasterization, a clipper 1829 processes vertex data. The clipper 1829 may be a fixed function clipper or a programmable clipper having clipping and geometry shader functions. In some embodiments, a rasterizer and depth test component 1873 in the render output pipeline 1870 dispatches pixel shaders to convert the geometric objects into their per pixel representations. In some embodiments, pixel shader logic is included in thread execution logic 1850. In some embodiments, an application can bypass the rasterizer and depth test component 1873 and access un-rasterized vertex data via a stream out unit 1823.

The graphics processor 1800 has an interconnect bus, interconnect fabric, or some other interconnect mechanism that allows data and message passing amongst the major components of the processor. In some embodiments, execution units 1852A, 1852B and associated cache(s) 1851, texture and media sampler 1854, and texture/sampler cache 1858 interconnect via a data port 1856 to perform memory access and communicate with render output pipeline components of the processor. In some embodiments, sampler 1854, caches 1851, 1858 and execution units 1852A, 1852B each have separate memory access paths.

In some embodiments, render output pipeline 1870 contains a rasterizer and depth test component 1873 that converts vertex-based objects into an associated pixel-based representation. In some embodiments, the rasterizer logic includes a windower/masker unit to perform fixed function triangle and line rasterization. An associated render cache 1878 and depth cache 1879 are also available in some embodiments. A pixel operations component 1877 performs pixel-based operations on the data, though in some instances, pixel operations associated with 2D operations (e.g. bit block image transfers with blending) are performed by the 2D engine 1841, or substituted at display time by the display controller 1843 using overlay display planes. In some embodiments, a shared L3 cache 1875 is available to all graphics components, allowing the sharing of data without the use of main system memory.

In some embodiments, graphics processor media pipeline 1830 includes a media engine 1837 and a video front end 1834. In some embodiments, video front end 1834 receives pipeline commands from the command streamer 1803. In some embodiments, media pipeline 1830 includes a separate command streamer. In some embodiments, video front-end 1834 processes media commands before sending the command to the media engine 1837. In some embodiments, media engine 1837 includes thread spawning functionality to spawn threads for dispatch to thread execution logic 1850 via thread dispatcher 1831.

In some embodiments, graphics processor 1800 includes a display engine 1840. In some embodiments, display engine 1840 is external to processor 1800 and couples with the graphics processor via the ring interconnect 1802, or some other interconnect bus or fabric. In some embodiments, display engine 1840 includes a 2D engine 1841 and a display controller 1843. In some embodiments, display engine 1840 contains special purpose logic capable of operating independently of the 3D pipeline. In some embodiments, display controller 1843 couples with a display device (not shown), which may be a system integrated display device, as in a laptop computer, or an external display device attached via a display device connector.

In some embodiments, graphics pipeline 1820 and media pipeline 1830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 19A is a block diagram illustrating a graphics processor command format 1900 according to some embodiments. FIG. 19B is a block diagram illustrating a graphics processor command sequence 1910 according to an embodiment. The solid lined boxes in FIG. 19A illustrate the components that are generally included in a graphics command while the dashed lines include components that are optional or that are only included in a sub-set of the graphics commands. The exemplary graphics processor command format 1900 of FIG. 19A includes data fields to identify a target client 1902 of the command, a command operation code (opcode) 1904, and the relevant data 1906 for the command. A sub-opcode 1905 and a command size 1908 are also included in some commands.

In some embodiments, client 1902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 1904 and, if present, sub-opcode 1905 to determine the operation to perform. The client unit performs the command using information in data field 1906. For some commands an explicit command size 1908 is expected to specify the size of the command. In some embodiments, the command parser automatically determines the size of at least some of the commands based on the command opcode. In some embodiments commands are aligned via multiples of a double word.

The flow diagram in FIG. 19B shows an exemplary graphics processor command sequence 1910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 1910 may begin with a pipeline flush command 1912 to cause any active graphics pipeline to complete the currently pending commands for the pipeline. In some embodiments, the 3D pipeline 1922 and the media pipeline 1924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 1912 can be used for pipeline synchronization or before placing the graphics processor into a low power state.

In some embodiments, a pipeline select command 1913 is used when a command sequence requires the graphics processor to explicitly switch between pipelines. In some embodiments, a pipeline select command 1913 is required only once within an execution context before issuing pipeline commands unless the context is to issue commands for both pipelines. In some embodiments, a pipeline flush command is 1912 is required immediately before a pipeline switch via the pipeline select command 1913.

In some embodiments, a pipeline control command 1914 configures a graphics pipeline for operation and is used to program the 3D pipeline 1922 and the media pipeline 1924. In some embodiments, pipeline control command 1914 configures the pipeline state for the active pipeline. In one embodiment, the pipeline control command 1914 is used for pipeline synchronization and to clear data from one or more cache memories within the active pipeline before processing a batch of commands.

In some embodiments, return buffer state commands 1916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 1916 includes selecting the size and number of return buffers to use for a set of pipeline operations.

The remaining commands in the command sequence differ based on the active pipeline for operations. Based on a pipeline determination 1920, the command sequence is tailored to the 3D pipeline 1922 beginning with the 3D pipeline state 1930 or the media pipeline 1924 beginning at the media pipeline state 1940.

The commands to configure the 3D pipeline state 1930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 1930 commands are also able to selectively disable or bypass certain pipeline elements if those elements will not be used.

In some embodiments, 3D primitive 1932 command is used to submit 3D primitives to be processed by the 3D pipeline. Commands and associated parameters that are passed to the graphics processor via the 3D primitive 1932 command are forwarded to the vertex fetch function in the graphics pipeline. The vertex fetch function uses the 3D primitive 1932 command data to generate vertex data structures. The vertex data structures are stored in one or more return buffers. In some embodiments, 3D primitive 1932 command is used to perform vertex operations on 3D primitives via vertex shaders. To process vertex shaders, 3D pipeline 1922 dispatches shader execution threads to graphics processor execution units.

In some embodiments, 3D pipeline 1922 is triggered via an execute 1934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 1910 follows the media pipeline 1924 path when performing media operations. In general, the specific use and manner of programming for the media pipeline 1924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 1924 is configured in a similar manner as the 3D pipeline 1922. A set of commands to configure the media pipeline state 1940 are dispatched or placed into a command queue before the media object commands 1942. In some embodiments, media pipeline state commands 1940 include data to configure the media pipeline elements that will be used to process the media objects. This includes data to configure the video decode and video encode logic within the media pipeline, such as encode or decode format. In some embodiments, media pipeline state commands 1940 also support the use of one or more pointers to "indirect" state elements that contain a batch of state settings.

In some embodiments, media object commands 1942 supply pointers to media objects for processing by the media pipeline. The media objects include memory buffers containing video data to be processed. In some embodiments, all media pipeline states must be valid before issuing a media object command 1942. Once the pipeline state is configured and media object commands 1942 are queued, the media pipeline 1924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 20:
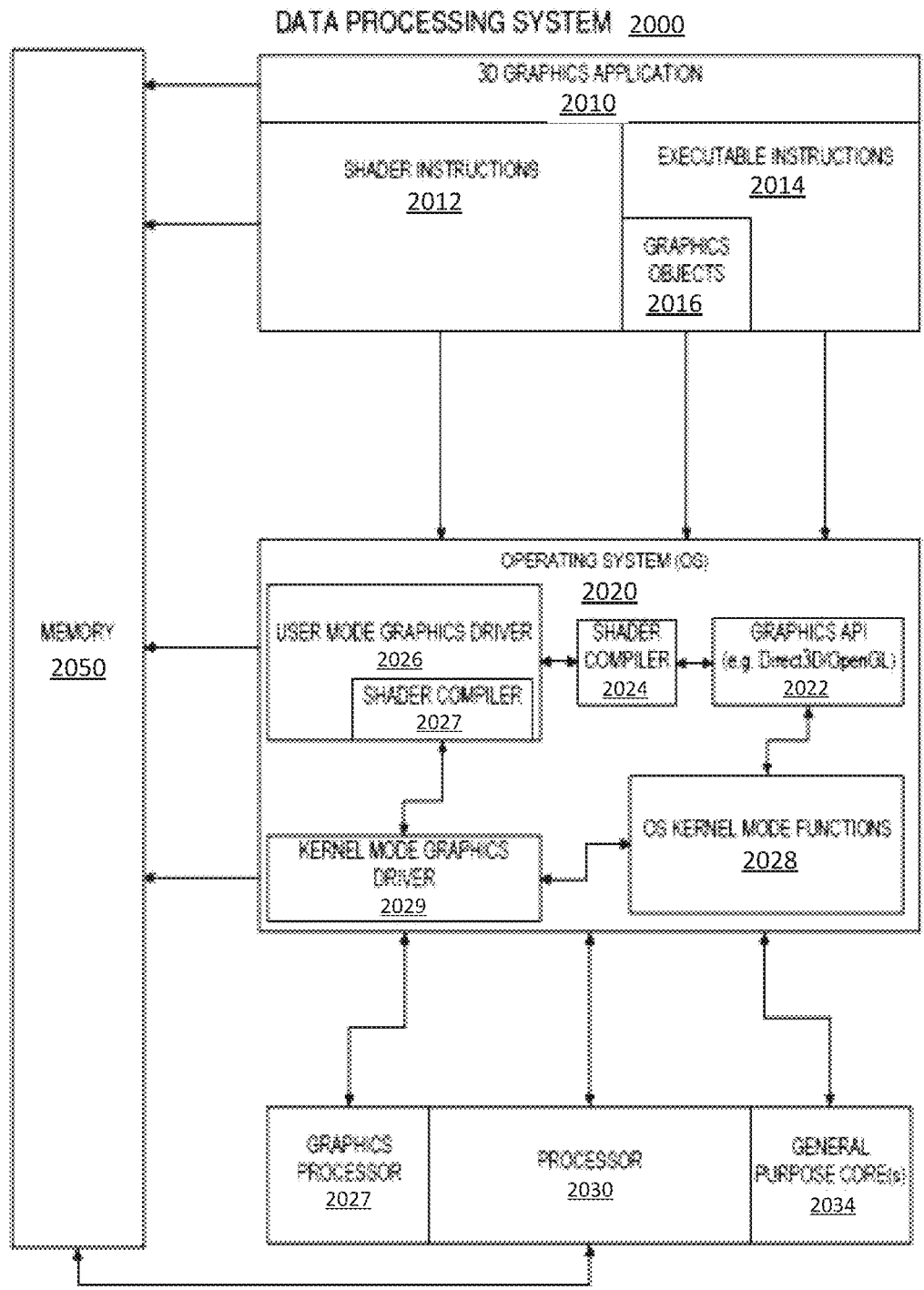
FIG. 20 illustrates exemplary graphics software architecture for a data processing system according to an embodiment.

FIG. 20 illustrates exemplary graphics software architecture for a data processing system 2000 according to some embodiments. In some embodiments, software architecture includes a 3D graphics application 2010, an operating system 2020, and at least one processor 2030. In some embodiments, processor 2030 includes a graphics processor 2032 and one or more general-purpose processor core(s) 2034. The graphics application 2010 and operating system 2020 each execute in the system memory 2050 of the data processing system.

In some embodiments, 3D graphics application 2010 contains one or more shader programs including shader instructions 2012. The shader language instructions may be in a high-level shader language, such as the High Level Shader Language (HLSL) or the OpenGL Shader Language (GLSL). The application also includes executable instructions 2014 in a machine language suitable for execution by the general-purpose processor core 2034. The application also includes graphics objects 2016 defined by vertex data.

In some embodiments, operating system 2020 is a Microsoft® Windows® operating system from the Microsoft Corporation, a proprietary UNIX-like operating system, or an open source UNIX-like operating system using a variant of the Linux kernel. The operating system 2020 can support a graphics API 1022 such as the Direct3D API, the OpenGL API, or the Vulkan API. When the Direct3D API is in use, the operating system 2020 uses a front-end shader compiler 2024 to compile any shader instructions 2012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 2010. In some embodiments, the shader instructions 2012 are provided in an intermediate form, such as a version of the Standard Portable Intermediate Representation (SPIR) used by the Vulkan API.

In some embodiments, user mode graphics driver 2026 contains a back-end shader compiler 2027 to convert the shader instructions 2012 into a hardware specific representation. When the OpenGL API is in use, shader instructions 2012 in the GLSL high-level language are passed to a user mode graphics driver 2026 for compilation. In some embodiments, user mode graphics driver 2026 uses operating system kernel mode functions 2028 to communicate with a kernel mode graphics driver 2029. In some embodiments, kernel mode graphics driver 2029 communicates with graphics processor 2032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 21:
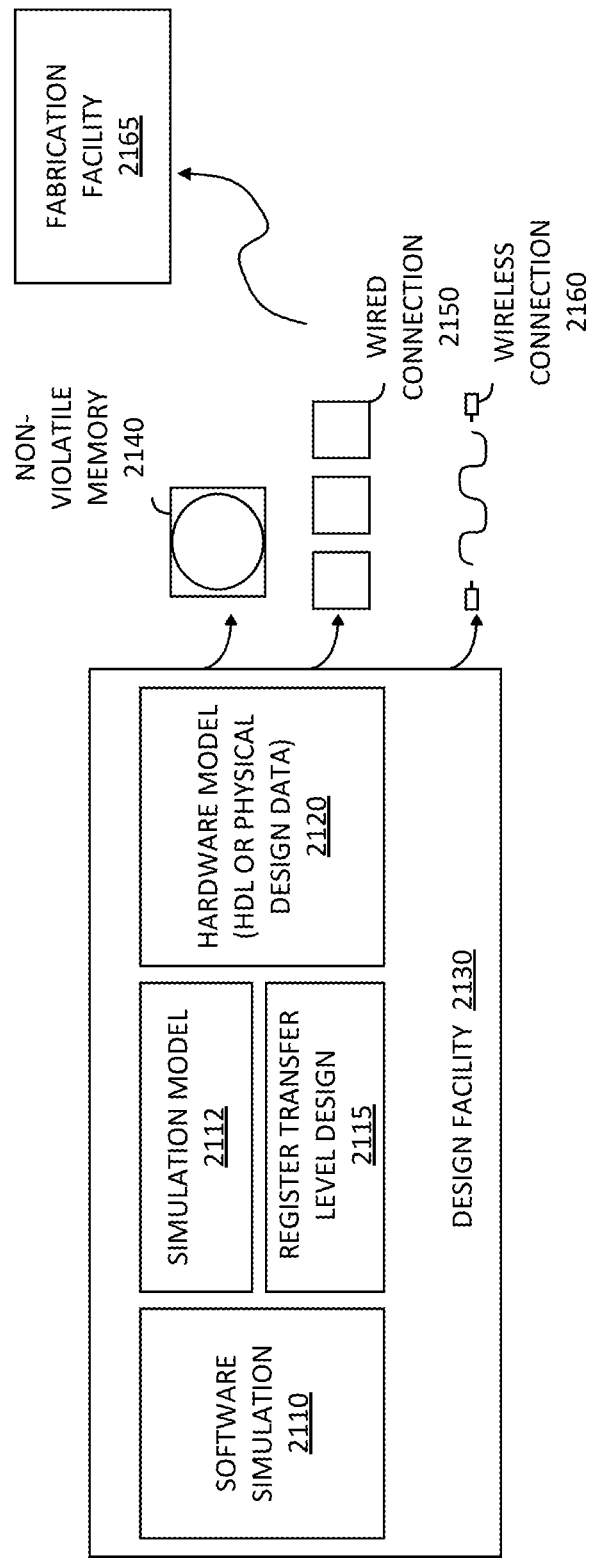
FIG. 21 is a block diagram illustrating an IP core development system that may be used to manufacture an integrated circuit to perform operations according to an embodiment.

FIG. 21 is a block diagram illustrating an IP core development 2100 that may be used to manufacture an integrated circuit to perform operations according to an embodiment. The IP core development system 2100 may be used to generate modular, re-usable designs that can be incorporated into a larger design or used to construct an entire integrated circuit (e.g., an SOC integrated circuit). A design facility 2130 can generate a software simulation 2110 of an IP core design in a high level programming language (e.g., C/C++). The software simulation 2110 can be used to design, test, and verify the behavior of the IP core using a simulation model 2112. The simulation model 2112 may include functional, behavioral, and/or timing simulations. A register transfer level (RTL) design can then be created or synthesized from the simulation model 2100. The RTL design 2115 is an abstraction of the behavior of the integrated circuit that models the flow of digital signals between hardware registers, including the associated logic performed using the modeled digital signals. In addition to an RTL design 2115, lower-level designs at the logic level or transistor level may also be created, designed, or synthesized. Thus, the particular details of the initial design and simulation may vary.

The RTL design 2115 or equivalent may be further synthesized by the design facility into a hardware model 2120, which may be in a hardware description language (HDL), or some other representation of physical design data. The HDL may be further simulated or tested to verify the IP core design. The IP core design can be stored for delivery to a $3^{rd}$ party fabrication facility 2165 using non-volatile memory 2140 (e.g., hard disk, flash memory, or any non-volatile storage medium). Alternatively, the IP core design may be transmitted (e.g., via the Internet) over a wired connection 2150 or wireless connection 2160. The fabrication facility 2165 may then fabricate an integrated circuit that is based at least in part on the IP core design. The fabricated integrated circuit can be configured to perform operations in accordance with at least one embodiment described herein.

Exemplary System on a Chip Integrated Circuit

Figure 22:
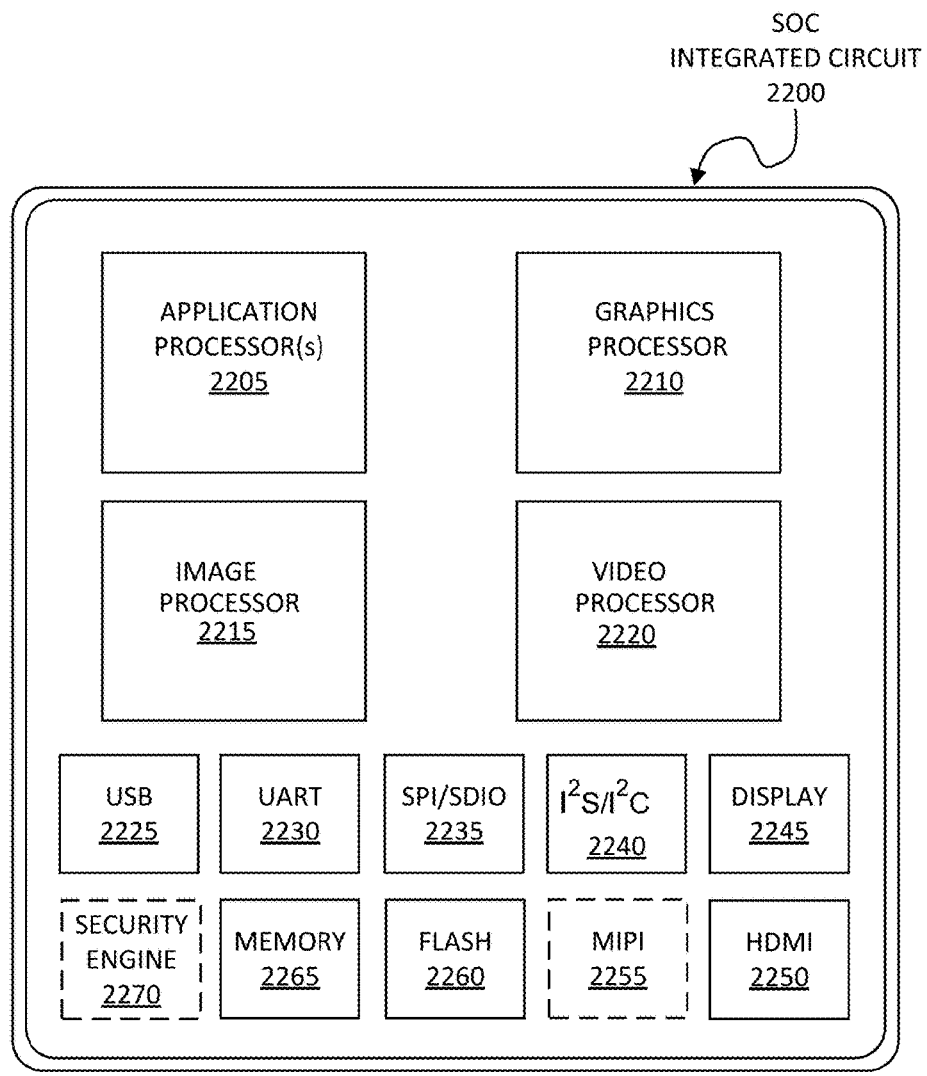
FIG. 22 is a block diagram illustrating an exemplary system on a chip integrated circuit that may be fabricated using one or more IP cores, according to an embodiment.
Figure 23:
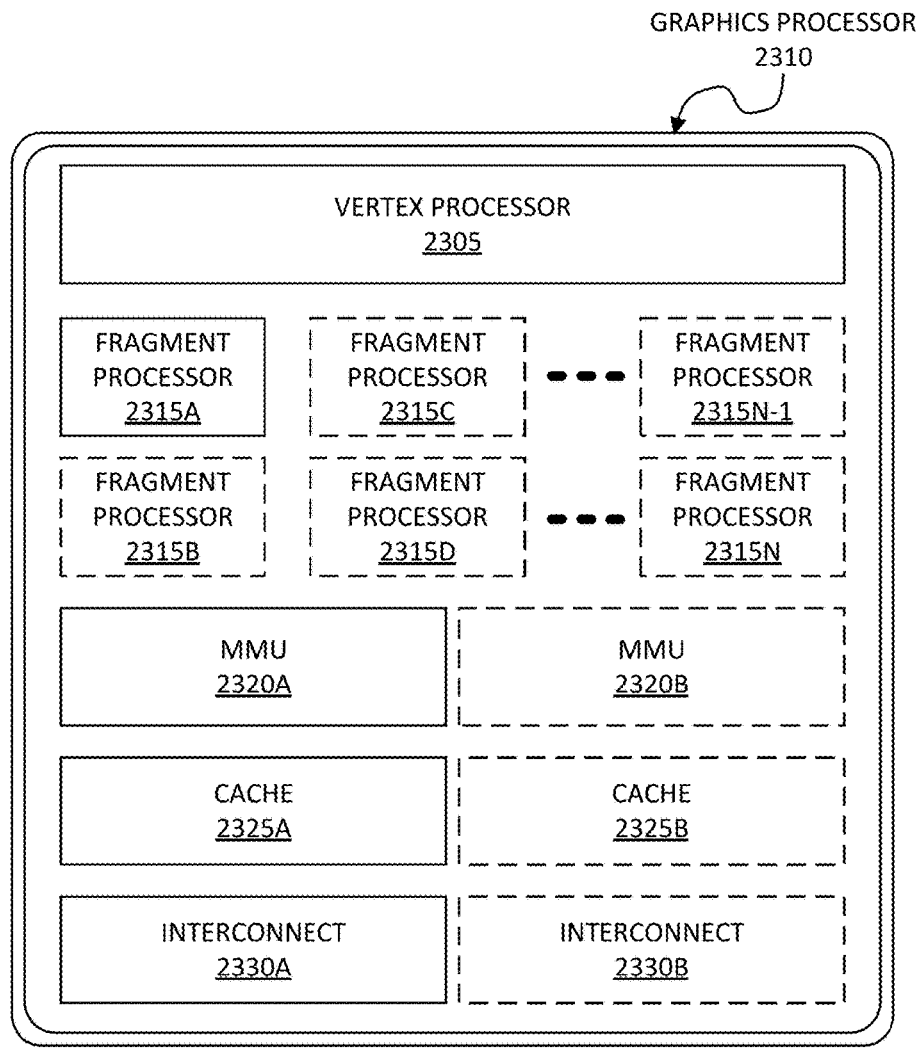
FIG. 23 is a block diagram illustrating an exemplary graphics processor of a system on a chip integrated circuit that may be fabricated using one or more IP cores, according to an embodiment.
Figure 24:
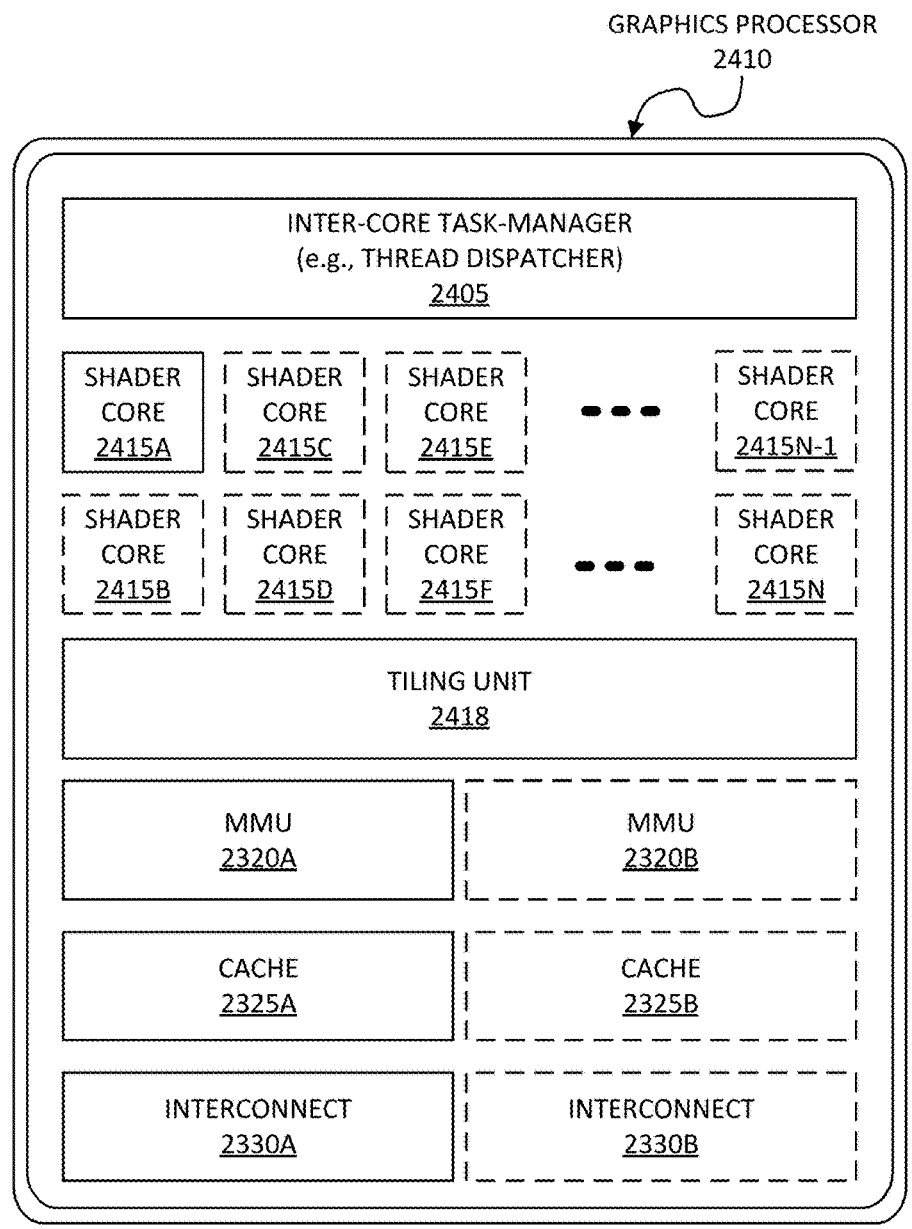
FIG. 24 is a block diagram illustrating an additional exemplary graphics processor of a system on a chip integrated circuit that may be fabricated using one or more IP cores, according to an embodiment.

FIGS. 22-24 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 22 is a block diagram illustrating an exemplary system on a chip integrated circuit 2200 that may be fabricated using one or more IP cores, according to an embodiment. Exemplary integrated circuit 2200 includes one or more application processor(s) 2205 (e.g., CPUs), at least one graphics processor 2210, and may additionally include an image processor 2215 and/or a video processor 2220, any of which may be a modular IP core from the same or multiple different design facilities. Integrated circuit 2200 includes peripheral or bus logic including a USB controller 2225, UART controller 2230, an SPI/SDIO controller 2235, and an $I^2S/I^2C$ controller 2240. Additionally, the integrated circuit can include a display device 2245 coupled to one or more of a high-definition multimedia interface (HDMI) controller 2250 and a mobile industry processor interface (MIPI) display interface 2255. Storage may be provided by a flash memory subsystem 2260 including flash memory and a flash memory controller. Memory interface may be provided via a memory controller 2265 for access to SDRAM or SRAM memory devices. Some integrated circuits additionally include an embedded security engine 2270.

Additionally, other logic and circuits may be included in the processor of integrated circuit 2200, including additional graphics processors/cores, peripheral interface controllers, or general purpose processor cores.

FIG. 23 is a block diagram illustrating an exemplary graphics processor 2310 of a system on a chip integrated circuit that may be fabricated using one or more IP cores, according to an embodiment. Graphics processor 2310 can be a variant of the graphics processor 2210 of FIG. 22. Graphics processor 2310 includes a vertex processor 2305 and one or more fragment processor(s) 2315A-2315N (e.g., 2315A, 2315B, 2315C, 2315D, through 2315N-1, and 2315N). Graphics processor 2310 can execute different shader programs via separate logic, such that the vertex processor 2305 is optimized to execute operations for vertex shader programs, while the one or more fragment processor(s) 2315A-2315N execute fragment (e.g., pixel) shading operations for fragment or pixel shader programs. The vertex processor 2305 performs the vertex processing stage of the 3D graphics pipeline and generates primitives and vertex data. The fragment processor(s) 2315A-2315N use the primitive and vertex data generated by the vertex processor 2305 to produce a framebuffer that is displayed on a display device. In one embodiment, the fragment processor(s) 2315A-2315N are optimized to execute fragment shader programs as provided for in the OpenGL API, which may be used to perform similar operations as a pixel shader program as provided for in the Direct 3D API.

Graphics processor 2310 additionally includes one or more memory management units (MMUs) 2320A-2320B, cache(s) 2325A-2325B, and circuit interconnect(s) 2330A-2330B. The one or more MMU(s) 2320A-2320B provide for virtual to physical address mapping for integrated circuit 2310, including for the vertex processor 2305 and/or fragment processor(s) 2315A-2315N, which may reference vertex or image/texture data stored in memory, in addition to vertex or image/texture data stored in the one or more cache(s) 2325A-2325B. In one embodiment the one or more MMU(s) 2325A-2325B may be synchronized with other MMUs within the system, including one or more MMUs associated with the one or more application processor(s) 1705, image processor 2215, and/or video processor 2220 of FIG. 22, such that each processor 2205-2220 can participate in a shared or unified virtual memory system. The one or more circuit interconnect(s) 2330A-2330B enable graphics processor 2310 to interface with other IP cores within the SoC, either via an internal bus of the SoC or via a direct connection, according to embodiments.

FIG. 24 is a block diagram illustrating an additional exemplary graphics processor 2410 of a system on a chip integrated circuit that may be fabricated using one or more IP cores, according to an embodiment. Graphics processor 2410 can be a variant of the graphics processor 2210 of FIG. 22. Graphics processor 2410 includes the one or more MMU(s) 2320A-2320B, caches 2325A-2325B, and circuit interconnects 2330A-2330B of the integrated circuit 2300 of FIG. 23.

Graphics processor 2410 includes one or more shader core(s) 2415A-2415N (e.g., 2415A, 2415B, 2415C, 2415D, 2415E, 2415F, through 2315N-1, and 2315N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 2410 includes an inter-core task manager 2405, which acts as a thread dispatcher to dispatch execution threads to one or more shader cores 2415A-2415N and a tiling unit 2418 to accelerate tiling operations for tile-based rendering, in which rendering operations for a scene are subdivided in image space, for example to exploit local spatial coherence within a scene or to optimize use of internal caches.

Additional and Alternative Implementation Notes

In the above description of example implementations, for purposes of explanation, specific numbers, materials configurations, and other details are set forth to explain better the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques," for instance, may refer to one or more devices, apparatuses, systems, methods, articles of manufacture, and computer-readable instructions as indicated by the context described herein.

As used in this application, the term "or" is intended to mean an inclusive "or" rather than an exclusive "or." That is unless specified otherwise or clear from context, "X employs A or B" is intended to mean any of the natural inclusive permutations. That is if X employs A; X employs B; or X employs both A and B, then "X employs A or B" is satisfied under any of the preceding instances. Also, the articles "an" and "an" as used in this application and the appended claims should be construed to mean "one or more," unless specified otherwise or clear from context to be directed to a singular form.

These processes are illustrated as a collection of blocks in a logical flow graph, which represents a sequence of operations that can be implemented in mechanics alone or a combination of hardware, software, and firmware. In the context of software/firmware, the blocks represent instructions stored on one or more computer-readable storage media that, when executed by one or more processors, perform the recited operations.

Note that the order in which the processes are described is not intended to be construed as a limitation and any number of the described process blocks can be combined in any order to implement the processes or an alternate process. Additionally, individual blocks may be deleted from the processes without departing from the spirit and scope of the subject matter described herein.

The term "computer-readable media" includes computer-storage media. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

In the claims appended herein, the inventor invokes 35 U.S.C. § 112(f) or paragraph 6 only when the words "means for" or "steps for" are used in the claim. If such words are not used in a claim, then the inventor does not intend for the claim to be construed to cover the corresponding structure, material, or acts described herein (and equivalents thereof) in accordance with 35 U.S.C. 112(f) or paragraph 6.

To the extent various operations or functions are described herein, they can be described or defined as hardware circuitry, software code, instructions, configuration, and/or data. The content can be embodied in hardware logic, or as directly executable software ("object" or "executable" form), source code, high-level shader code designed for execution on a graphics engine, or low-level assembly language code in an instruction set for a specific processor or graphics core. The software content of the embodiments described herein can be provided via an article of manufacture with the content stored thereon, or via a method of operating a communication interface to send data via the communication interface.

A non-transitory machine-readable storage medium can cause a machine to perform the functions or operations described, and includes any mechanism that stores information in a form accessible by a machine (e.g., computing device, electronic system, etc.), such as recordable/non-recordable media (e.g., read-only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

The following examples pertain to further embodiments:

In Example 1: A graphics processing unit (GPU), the GPU comprising: one or more graphics cores configured to process computer graphics, the one or more graphics cores being further configured to operate with a memory; the one or more graphics cores being further configured to: generate a Z-plane for a triangle that covers at least one multi-sample pixel which has multiple samples; produce a reformatted Z-plane configured to store in a memory in a block compression format, the format includes a reference depth field configured to store a reference depth value, a slope field configured to store two slope values, and a slope shift field that specifies a right shift for the two slope values; process the reformatted Z-plane to produce depth values of one or more of the samples of the multiple samples in the pixels covered by the block compression format.

In Example 2: A GPU recited in Example 1, wherein the depth values produced are unnormalized integers representing depth values in a range of zero to one.

In Example 3: A GPU as recited in Example 1, wherein the reference depth field is configured to store a 47-bit value, the slope shift field configured to store a 5-bit value, and the slope field configured to store two 26-bit slope values.

In Example 4: A GPU recited in Example 1, wherein, the reference depth field is configured to store a 35-bit value, the slope shift field configured to store a 4-bit value, and the slope field configured to store two 19-bit slope values.

In Example 5: A GPU recited in Example 1, wherein the format further includes an exponent field and the depth values produced are floating point values.

In Example 6: A GPU as recited in Example 5, wherein the exponent field is configured to store an 8-bit value, the reference depth field is configured to store a 47-bit value, the slope shift field configured to store a 5-bit value, and the slope field configured to store two 26-bit slope values.

In Example 7: A GPU recited in Example 5, wherein the exponent field is configured to store an 8-bit value, the reference depth field is configured to store a 35-bit value, the slope shift field configured to store a 4-bit value, and the slope field configured to store two 19-bit slope values.

In Example 8: One or more computer-readable media storing instructions thereon that, when executed by one or more processors, direct the one or more processors to perform operations comprising: generating a Z-plane for a triangle that covers at least one multi-sample pixel which has multiple samples; producing a reformatted Z-plane configured to store in a memory in a block compression format, the format includes a reference depth field configured to store a reference depth value, a slope field configured to store two slope values, and a slope shift field that specifies a right shift for the two slope values; processing the reformatted Z-plane to produce depth values of one or more of the samples of the multiple samples in the pixels covered by the block compression format.

In Example 9: One or more computer-readable media of Example 8, wherein the depth values produced are unnormalized integers representing depth values in a range of zero to one.

In Example 10: One or more computer-readable media of Example 8, wherein the reference depth field is configured to store a 47-bit value, the slope shift field configured to store a 5-bit value, and the slope field configured to store two 26-bit slope values.

In Example 11: One or more computer-readable media of Example 8, wherein, the reference depth field is configured to store a 35-bit value, the slope shift field configured to store a 4-bit value, and the slope field configured to store two 19-bit slope values.

In Example 12: One or more computer-readable media of Example 8, wherein the format further includes an exponent field and the depth values produced are floating point values.

In Example 13: One or more computer-readable media of Example 12, wherein the exponent field is configured to store an 8-bit value, the reference depth field is configured to store a 47-bit value, the slope shift field configured to store a 5-bit value, and the slope field configured to store two 26-bit slope values.

In Example 14: One or more computer-readable media of Example 12, wherein the exponent field is configured to store an 8-bit value, the reference depth field is configured to store a 35-bit value, the slope shift field configured to store a 4-bit value, and the slope field configured to store two 19-bit slope values.

In Example 15: A computer graphics system comprising: a Z-plane generator configured to generate a Z-plane for a triangle that covers at least one multi-sample pixel which has multiple samples; a Z-plane reformatter configured to produce a reformatted Z-plane configured to store in a memory in a block compression format, the format includes a reference depth field configured to store a reference depth value, a slope field configured to store two slope values, and a slope shift field that specifies a right shift for the two slope values; a Z-plane processor configured to process the reformatted Z-plane to produce depth values of one or more of the samples of the multiple samples in the pixels covered by the block compression format.

In Example 16: A system of Example 15, wherein the depth values produced are unnormalized integers representing depth values in a range of zero to one.

In Example 17: A system of Example 15, wherein the reference depth field is configured to store a 47-bit value, the slope shift field configured to store a 5-bit value, and the slope field configured to store two 26-bit slope values.

In Example 18: A system of Example 15, wherein, the reference depth field is configured to store a 35-bit value, the slope shift field configured to store a 4-bit value, and the slope field configured to store two 19-bit slope values.

In Example 19: A system of Example 15, wherein the format further includes an exponent field and the depth values produced are floating point values.

In Example 20: A system of Example 19, wherein the exponent field is configured to store an 8-bit value, the reference depth field is configured to store a 47-bit value, the slope shift field configured to store a 5-bit value, and the slope field configured to store two 26-bit slope values.

In Example 21: A system of Example 19, wherein the exponent field is configured to store an 8-bit value, the reference depth field is configured to store a 35-bit value, the slope shift field configured to store a 4-bit value, and the slope field configured to store two 19-bit slope values.

What is claimed is:

1. A graphics processor comprising:
    a memory; and
    one or more graphics cores configured to operate with the memory to process computer graphics, the processing of computer graphics comprising:
    generating a Z-plane for a triangle that covers at least one multi-sample pixel which has multiple samples;
    producing a reformatted Z-plane configured to store in the memory in a block compression format, wherein the format includes a reference depth field configured to store a reference depth value, a slope field configured to store two slope values, and a slope shift field that specifies a right shift for the two slope values; and
    processing the reformatted Z-plane to produce depth values of one or more samples of the multiple samples of the at least one pixel covered by the block compression format.

2. The graphics processor recited in claim 1, wherein the produced depth values are un-normalized integers representing depth values in a range of zero to one.

3. The graphics processor as recited in claim 1, wherein the reference depth field is configured to store a 47-bit value, the slope shift field configured to store a 5-bit value, and the slope field configured to store two 26-bit slope values.

4. The graphics processor recited in claim 1, wherein, the reference depth field is configured to store a 35-bit value, the slope shift field is configured to store a 4-bit value, and the slope field is configured to store two 19-bit slope values.

5. The graphics processor recited in claim 1, wherein the format further includes an exponent field, and the produced depth values are floating point values.

6. The graphics processor as recited in claim 5, wherein the exponent field is configured to store an 8-bit value, the reference depth field is configured to store a 47-bit value, the slope shift field configured to store a 5-bit value, and the slope field is configured to store two 26-bit slope values.

7. The graphics processor recited in claim 5, wherein the exponent field is configured to store an 8-bit value, the reference depth field is configured to store a 35-bit value, the slope shift field is configured to store a 4-bit value, and the slope field is configured to store two 19-bit slope values.

8. One or more non-transitory computer-readable media storing instructions thereon that, when executed by one or more processors, direct the one or more processors to perform operations comprising:
generating a Z-plane for a triangle that covers at least one multi-sample pixel which has multiple samples;
producing a reformatted Z-plane configured to store in a memory in a block compression format, wherein the format includes a reference depth field configured to store a reference depth value, a slope field configured to store two slope values, and a slope shift field that specifies a right shift for the two slope values; and
processing the reformatted Z-plane to produce depth values of one or more samples of the multiple samples of the at least one pixel covered by the block compression format.

9. The one or more non-transitory computer-readable media of claim 8, wherein the produced depth values produced are un-normalized integers representing depth values in a range of zero to one.

10. The one or more non-transitory computer-readable media of claim 8, wherein the reference depth field is configured to store a 47-bit value, the slope shift field is configured to store a 5-bit value, and the slope field is configured to store two 26-bit slope values.

11. The one or more non-transitory computer-readable media of claim 8, wherein, the reference depth field is configured to store a 35-bit value, the slope shift field is configured to store a 4-bit value, and the slope field is configured to store two 19-bit slope values.

12. The one or more non-transitory computer-readable media of claim 8, wherein the format further includes an exponent field and the produced depth values are floating point values.

13. The one or more non-transitory computer-readable media of claim 12, wherein the exponent field is configured to store an 8-bit value, the reference depth field is configured to store a 47-bit value, the slope shift field is configured to store a 5-bit value, and the slope field is configured to store two 26-bit slope values.

14. The one or more non-transitory computer-readable media of claim 12, wherein the exponent field is configured to store an 8-bit value, the reference depth field is configured to store a 35-bit value, the slope shift field is configured to store a 4-bit value, and the slope field is configured to store two 19-bit slope values.

15. A computer graphics system, comprising:
a graphics processor, the graphics processor comprising:
a Z-plane generator configured to generate a Z-plane for a triangle that covers at least one multi-sample pixel which has multiple samples;
a Z-plane reformatter configured to produce a reformatted Z-plane configured to store in a memory in a block compression format, wherein the format includes a reference depth field configured to store a reference depth value, a slope field configured to store two slope values, and a slope shift field that specifies a right shift for the two slope values; and
a Z-plane processor configured to process the reformatted Z-plane to produce depth values of one or more samples of the multiple samples of the at least one pixel covered by the block compression format.

16. The system of claim 15, wherein the produced depth values are un-normalized integers representing depth values in a range of zero to one.

17. The system of claim 15, wherein the reference depth field is configured to store a 47-bit value, the slope shift field is configured to store a 5-bit value, and the slope field is configured to store two 26-bit slope values.

18. The system of claim 15, wherein, the reference depth field is configured to store a 35-bit value, the slope shift field is configured to store a 4-bit value, and the slope field is configured to store two 19-bit slope values.

19. The system of claim 15, wherein the format further includes an exponent field and the produced depth values are floating point values.

20. The system of claim 19, wherein the exponent field is configured to store an 8-bit value, the reference depth field is configured to store a 47-bit value, the slope shift field is configured to store a 5-bit value, and the slope field is configured to store two 26-bit slope values.

* * * * *